(12) United States Patent
Moon

(10) Patent No.: US 12,113,785 B2
(45) Date of Patent: Oct. 8, 2024

(54) DIRECTORY SERVER PROVIDING TAG ENFORCEMENT AND NETWORK ENTITY ATTRACTION IN A SECURE PEER-TO-PEER DATA NETWORK

(71) Applicant: WhiteStar Communications, Inc., Durham, NC (US)

(72) Inventor: Billy Gayle Moon, Apex, NC (US)

(73) Assignee: WhiteStar Communications, Inc., Durham, NC (US)

( * ) Notice: Subject to any disclaimer, the term of this patent is extended or adjusted under 35 U.S.C. 154(b) by 476 days.

(21) Appl. No.: 17/372,607

(22) Filed: Jul. 12, 2021

(65) Prior Publication Data
US 2023/0012373 A1    Jan. 12, 2023

(51) Int. Cl.
*H04L 9/40* (2022.01)
(52) U.S. Cl.
CPC ........ *H04L 63/0815* (2013.01); *H04L 63/108* (2013.01); *H04L 63/20* (2013.01)
(58) Field of Classification Search
CPC ... H04L 63/0815; H04L 63/108; H04L 63/20; H04L 67/104
See application file for complete search history.

(56) References Cited

U.S. PATENT DOCUMENTS

| | | | |
|---|---|---|---|
| 7,792,989 B2 | 9/2010 | Toebes et al. | |
| 7,818,607 B2 | 10/2010 | Turner et al. | |
| 8,359,397 B2 * | 1/2013 | Traversat | H04L 61/00 709/227 |
| 2021/0014172 A1 * | 1/2021 | Chhabra | G06F 21/6218 |
| 2021/0026535 A1 | 1/2021 | Moon | |
| 2021/0026976 A1 | 1/2021 | Moon | |
| 2021/0028940 A1 | 1/2021 | Moon | |
| 2021/0028943 A1 | 1/2021 | Moon | |
| 2021/0029092 A1 | 1/2021 | Moon | |

(Continued)

OTHER PUBLICATIONS

"4-Way Handshake", Jan. 24, 2019, [online], [retrieved on Jun. 1, 2021]. Retrieved from the Internet: URL: https://www.wifi-professionals.com/2019/01/4-way-handshake>, pp. 1-21.

(Continued)

*Primary Examiner* — Alexander Lagor
*Assistant Examiner* — Rupali Dhakad
(74) *Attorney, Agent, or Firm* — Leon R. Turkevich

(57) ABSTRACT

In one embodiment, a method comprises: establishing, by a first executable resource in a network device having joined a secure peer-to-peer data network, a registry providing a mapping between one or more network entities associated with a tag object by an identified user entity, each network entity represented by a federation identifier of a user entity or a corresponding data object; receiving a search request for one or more identified network entities having been tagged with the tag object, and in response generating a search result based on identifying the network entities having been mapped relative to tag object, the search result identifying one or more of an identified federation identifier or an identified unique identifier for the identified network entities; and providing the search result by the first executable resource, the search result causing an endpoint device to attract the identified network entities for presentation by the endpoint device.

20 Claims, 16 Drawing Sheets

(56) References Cited

U.S. PATENT DOCUMENTS

| | | |
|---|---|---|
| 2021/0029125 A1 | 1/2021 | Moon |
| 2021/0029126 A1 | 1/2021 | Moon |
| 2021/0081524 A1 | 3/2021 | Moon |
| 2023/0033192 A1 | 2/2023 | Sutherland et al. |

OTHER PUBLICATIONS

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.

Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.

Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., et al., "Registration Extensions for IPv6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: URL: <https://tools.ietf.org/pdf/rfc8505.pdf>, pp. 1-47.

Wikipedia, "Indirection", Mar. 20, 2021, [online], [retrieved on Jun. 30, 2021]. Retrieved from the Internet: URL: <https://en.wikipedia.org/wiki/Indirection>, pp. 1-2.

Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/rfc4880.txt.pdf>, pp. 1-90.

Society video, "Society Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.

Society video, "Society Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jIVTcQmADw>, 5 pages.

Society video, "Society Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "Society Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

\* cited by examiner

DIRECTORY SERVER PROVIDING TAG ENFORCEMENT AND NETWORK ENTITY ATTRACTION IN A SECURE PEER-TO-PEER DATA NETWORK

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S Pub. 2021/0029126, the disclosures all of which are incorporated herein by reference to the extent not inconsistent with this application.

TECHNICAL FIELD

The present disclosure generally relates to distributed security in a secure peer-to-peer data network based on a real-time guardian protection of network devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-based based services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

Existing security threats in the Internet can exploit a user entity (e.g., business, association, government agency, etc.) acquiring a user "identity" that enables the user entity to be reached via the Internet. For example, a user entity can acquire a Uniform Resource Identifier (URI) from a prescribed naming authority (e.g., ICANN), and associate the URI with one or more domain name services (DNS); a user entity also can acquire a "social network identity" on an Internet-based service provider (e.g., Facebook, Twitter, etc.). The exposure of a user identity (e.g., URIs, social network identities) enables executable web crawlers of Internet search engines (e.g., Google, Bing, Yahoo, DuckDuckGo, etc.) or Internet-based service providers to data mine user metadata of the user entities, execute analytics to exploit the user metadata, implement unauthorized monetizing of the user metadata, and send unwanted web content to the user (e.g., targeted advertisements, addictive web content targeted for the user, etc.).

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
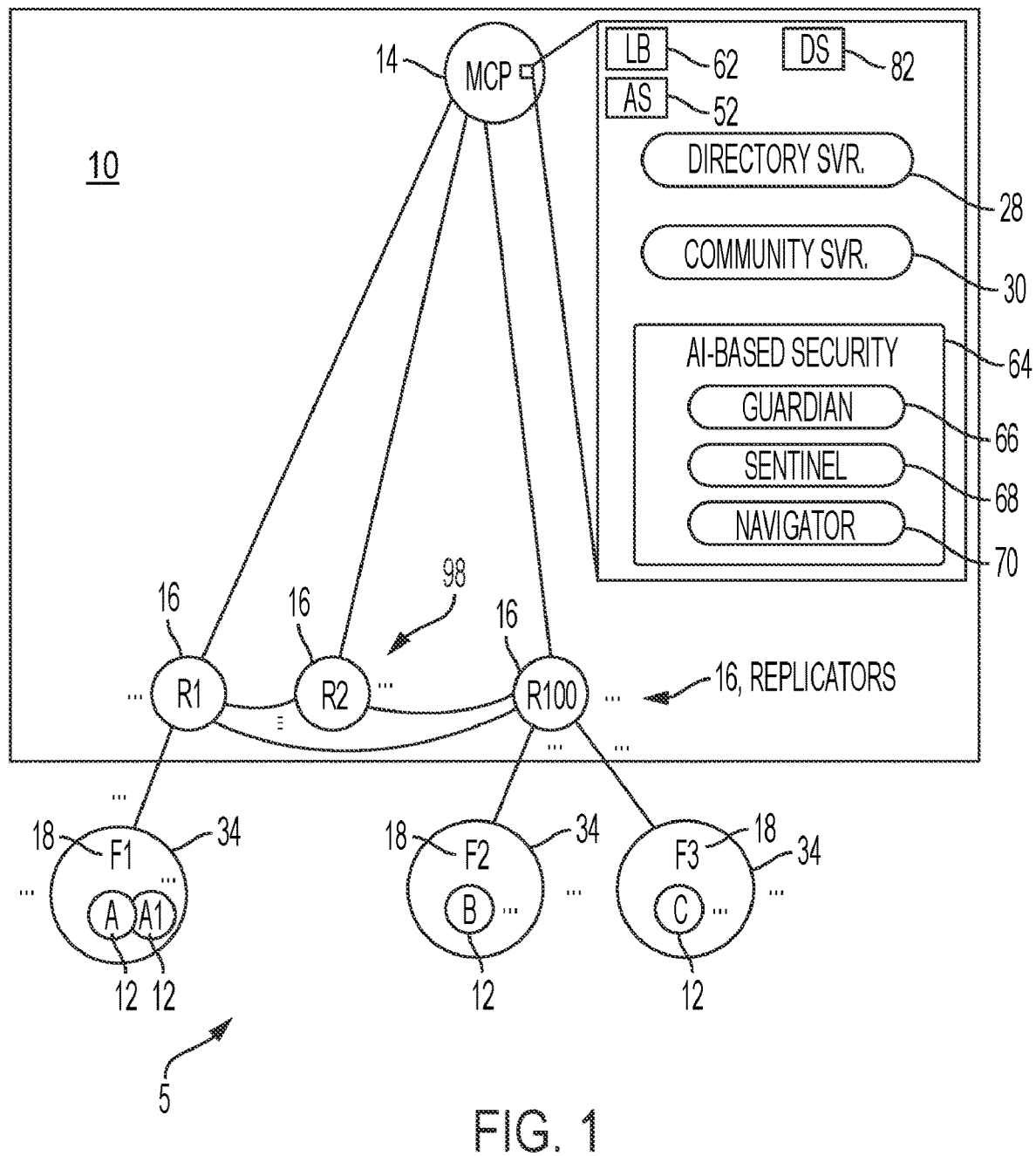
FIG. 1 illustrates a secure peer-to-peer data network comprising an apparatus executing a directory server providing tag enforcement and content attraction in a secure peer-to-peer data network, according to an example embodiment.

In one embodiment, a method comprises: establishing, by a first executable resource in a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner; receiving, by the first executable resource, a search request for one or more identified network entities having been tagged with the tag object, and in response generating a search result based on identifying the identified network entities having been mapped relative to tag object, the search result identifying one or more of an identified federation identifier or an identified unique identifier for the respective identified network entities; and providing the search result by the first executable resource, the search result causing an endpoint device to attract the identified network entities for presentation by the endpoint device.

In another embodiment, one or more non-transitory tangible media is encoded with logic for execution by a machine and when executed by the machine operable for: establishing, by a first executable resource in the machine implemented as a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner; receiving, by the first executable resource, a search request for one or more identified network entities having been tagged with the tag object, and in response generating a search result based on identifying the identified network entities having been mapped relative to tag object, the search result identifying one or more of an identified federation identifier or an identified unique identifier for the respective identified network entities; and providing the search result by the first executable resource, the search result causing an endpoint device to attract the identified network entities for presentation by the endpoint device.

In another embodiment, an apparatus comprises apparatus implemented as a physical machine, the apparatus comprising: non-transitory machine readable media configured for storing executable machine readable code; a device interface circuit; and a processor circuit. The processor circuit is configured for executing the machine readable code, and when executing the machine readable code operable for: establishing, by the apparatus implemented as a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner; receiving a search request for one or more identified network entities having been tagged with the tag object, and in response generating a search result based on identifying the identified network entities having been mapped relative to tag object, the search result identifying one or more of an identified federation identifier or an identified unique identifier for the respective identified network entities; and providing the search result for an endpoint device, the search result causing the endpoint device to attract the identified network entities for presentation by the endpoint device.

DETAILED DESCRIPTION

Particular embodiments enable secure information management by one or more directory servers in a secure peer-to-peer data network that is established based on an aggregation of two-way trusted relationships, where a novel ontological system for classifying information in the secure peer-to-peer data network eliminates the need for a conventional "search" operation as currently executed in the Internet (using a commercial search provider capable of data mining search queries).

In particular, example embodiments provide an authoritative ontological system maintained by one or more directory servers, where the authoritative ontological system can replace "searches" of URIs (where such URIs are alleging to represent a product, identity, or service). The authoritative ontological system enables management, discovery, and attraction of network entities in the secure peer-to-peer data network for presentation by an endpoint device, based on a tagging of the network entities with one or more tag objects having different authoritative ownership types. The different authoritative ownership types enable different tag objects to have a different search scope and authoritative effect in the secure peer-to-peer data network. Moreover, the tagging of identified network entities enables an endpoint device to "attract" the identified network entities for presentation by the endpoint device (e.g., to a user of the endpoint device), based on identifying the identified network entities having been mapped relative to a tag object, and further based on the endpoint device retrieving or "pulling" the identified network entities in the secure peer-to-peer data network based on the endpoint device establishing or verifying a two-way trusted relationship with either the network entities (in the case of a person or organizational user identified as a "federation"), or a federation having ownership of the network entities (in the case of data objects).

The management, discovery, and attraction of network entities is based on the tag objects having different authoritative ownership types that are managed and enforced by one or more directory servers. In one example embodiment, an endpoint device can execute a local directory server that can utilize a first tag object type, referred to herein as a "private" tag or "dot" tag, that restricts usage and search scope to a federation scope; in other words, the local directory server ensures that a "dot" tag is reserved exclusively by the "federation" user on the endpoint devices having a two-way trusted relationship with the "federation" user (as identified by each endpoint device having been allocated the corresponding federation identifier of the identified user). Hence, a "federation" user can utilize "dot" tags for personal and exclusive use only within his or her "federation", such that no entity outside his or her "federation" can ever gain access to any of the "dot" tags. Hence, the local directory server can establish and maintain a "dot" tag registry configured for managing the mapping between the "dot" tags in use by the "federation" user and one or more network entities tagged by the "dot" tags, described below.

The local directory server also can receive a search request for one or more identified network entities tagged with an identified "dot" tag object, and in response provide a search result of identified network entities mapped to the "dot" tag. As described below, the tagging of any network entity (e.g., a conversation object, a second "federation" user, etc.) with a "dot" tag by the "federation" user can cause the endpoint device to "attract" the network entity for presentation by the endpoint device (e.g., presenting the second "federation" user a secure invitation to join the conversation object).

In another example, a network-based directory server (or "network directory server") in the secure peer-to-peer data network can establish and maintain a second registry for management and mapping of a second object type, referred to herein as an "authoritatively-owned public tag" or "star" tag. The "star" tag can be granted by the network directory server to a "federation" user (as an identified user entity) for a renewable prescribed time interval (e.g., a lease interval), for example based on a payment by the "federation" user of a lease fee. The "star" tag grants to the "federation" user leasing the "star" tag an exclusive authority to tag a network entity in the secure peer-to-peer data network with an authoritative association between the tagged network entity and the "federation" user. In other words, the "star" tag grants to the identified user entity (e.g., a manufacturer of goods) exclusive authority to tag a network entity (e.g., a product brochure for a product made by the identified user entity), forming an authoritative association or "authoritative endorsement" between a product brochure and the manufacturer of the product; the "star" tag also can be used by influencers (e.g., celebrities, performing artists, politicians, etc.) to provide an authoritative endorsement of a network entity in the form of a user entity (i.e., another "federation" user) or a data object (e.g., an online community, online post, message, media content item, etc.).

The network-based network directory server in the secure peer-to-peer data network also can establish and maintain a third registry for management and mapping of a third object type, referred to herein as a "free public tag" or "hash" tag, where the "hash" tag is "owned" by the network-based network directory server in the secure peer-to-peer data network for unrestricted use by any user entity in the secure peer-to-peer data network.

The network-based network directory server in the secure peer-to-peer data network also can receive a search request for one or more identified network entities tagged with an identified "star" tag object and/or "hash" tag object, and in response provide a search result of identified network entities mapped to the identified tag objects. The search results enables an endpoint device to attract the identified network entities for presentation by the endpoint device to an associated "federation" user.

Hence, the example embodiments provide a secure information management of network entities in the secure peer-to-peer data network, where the network entities can include a federation identifier of a user entity, or a corresponding secure data object stored in in the secure peer-to-peer data network. The example embodiments enable a secure coordination and retrieval of information throughout the secure peer-to-peer data network based on enabling endpoint devices to securely attract identified network entities in a manner that protects user identities and content creation rights, without any hidden data mining by a third party.

A description will first be provided of the secure peer-to-peer data network, followed by a description of the local directory server and the network directory server that enable the management and searchability of network entities using different types of tag objects, according to an example embodiment.

Secure Private Core Network Overview

FIG. 1 illustrates a secure data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1" 12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
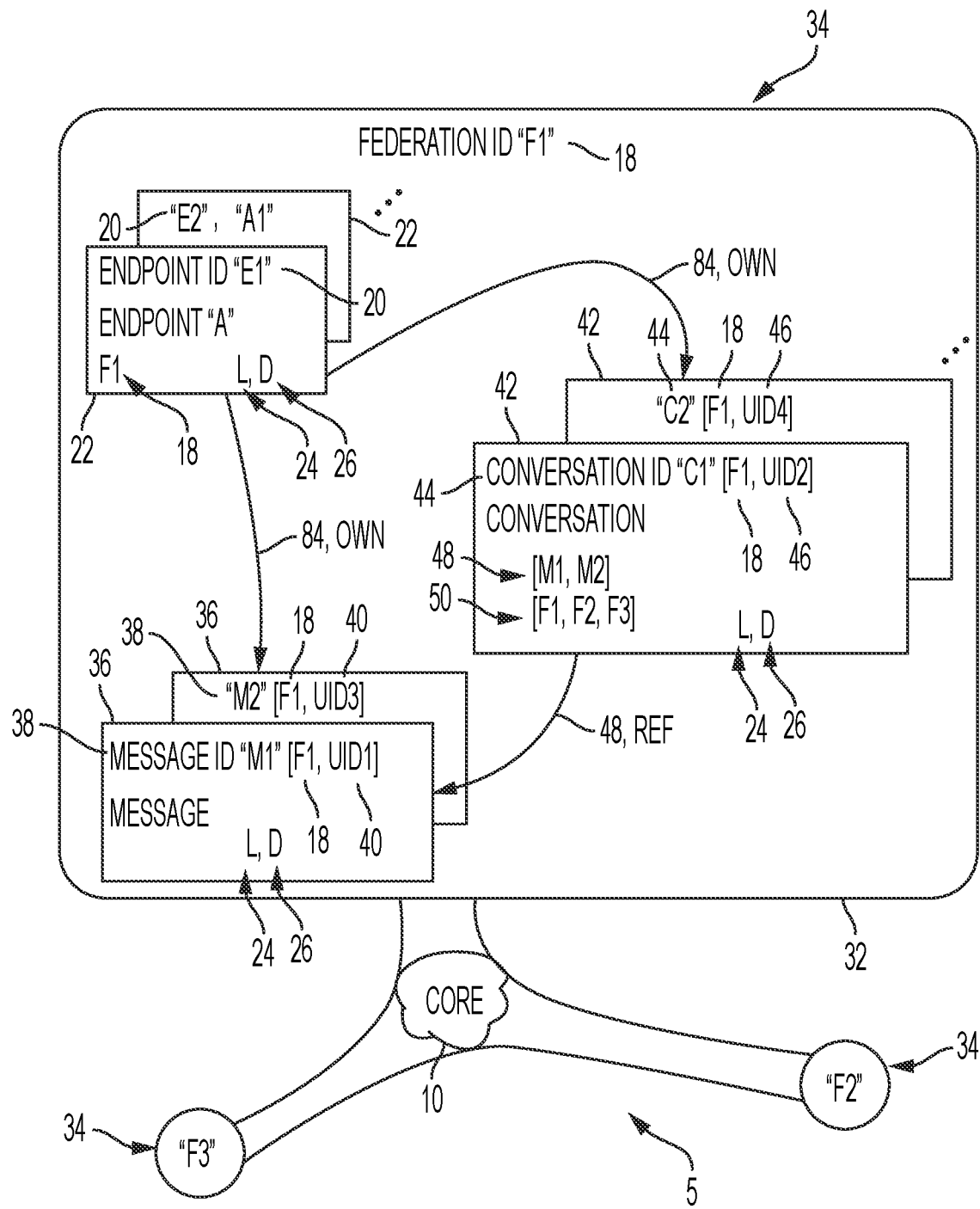
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 32. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Each conversation object 42 can reference zero or more message objects 36, and therefore can optionally include a message reference 48 of one or more message objects (e.g., "M1", "M2"); each conversation object 42 also can include a subscriber list 50 specifying at least the federation ID 18 of the federation 34 that created the conversation object 42 (e.g., that created the content in the referenced messages "M1" and "M2" from the message reference 48). A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a local P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a P2P data link or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data link) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last changed" timestamp. Example locally-stored data objects that can be generated by a federation owner on an endpoint device 12, and replicated and synchronized with other endpoint devices 12, can include: endpoint objects 22; conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
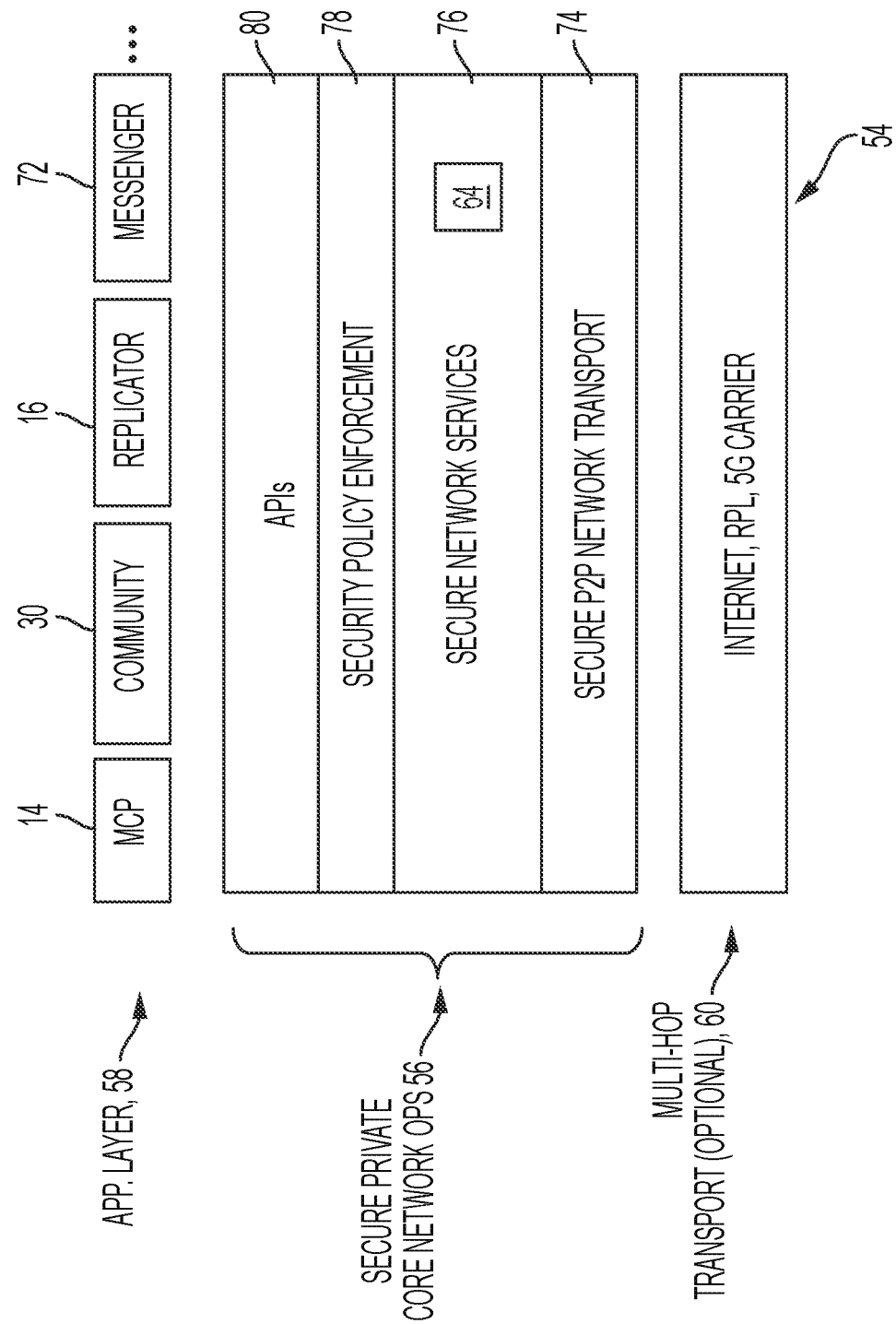
FIG. 3 illustrates an example implementation in an apparatus of executable code configured for providing operations for deployment of the secure peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 is the commercially available application "Society" from WhiteStar Communications, Inc., Durham, North Carolina, at the website address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Figure 9:
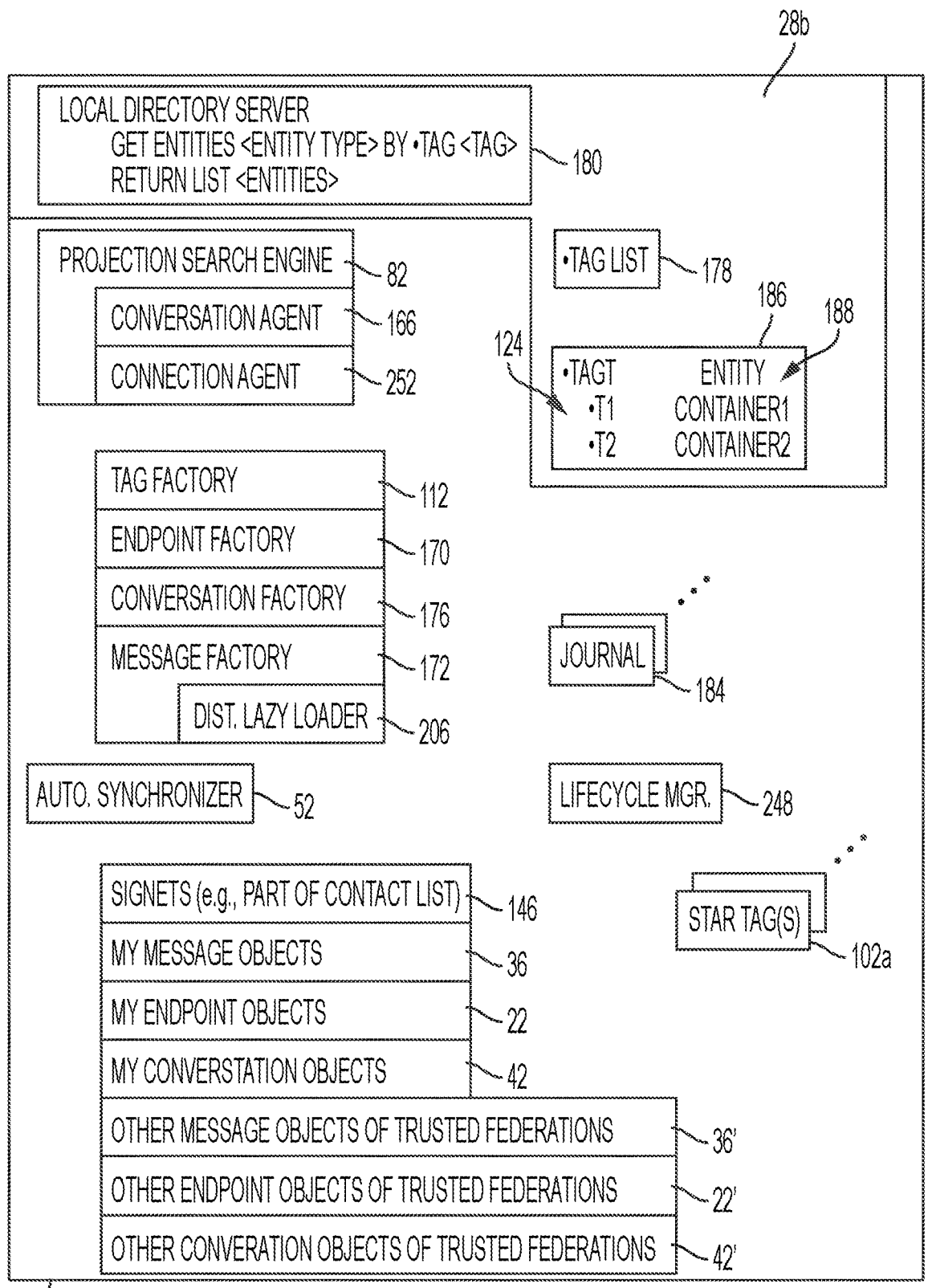
FIG. 9 illustrates an example local directory server in an endpoint object, according to an example embodiment.

Example secure network services 76, illustrated in FIGS. 1, 3, and 9, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82: the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components or executable agents of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

A problem in prior deployments of cyber security is that no known security system for a user network device maintained cryptographic security of a data packet having an encrypted payload that is received via a data network. To the contrary, at most a resource in a user network device would decrypt the encrypted payload to recover a decrypted payload, and store the decrypted payload as a local data structure in a memory circuit of the user network device. Hence, the storage of the decrypted payload "at rest" within a memory circuit of the user network device exposed the decrypted payload to a potential cyber-attack.

Although existing encryption applications enabled a user to execute encryption of locally-stored data structures on his or her user network device, such encryption applications are executed at the "application layer", resulting in the exposure of the decrypted data packet at the operating system level until a user executes the encryption application in the user network device for encryption of the locally-stored data structures.

Access to the secure private core network 10 by any physical network device 88 requires installation and instantiation of the network operating system 56. Further, the network operating system 56 operates as a secure executable container that only allows access to an internal executable code, access to an "at-rest" or "in-flight" stored data structure, or access to the secure data network 5 only via one or more of the prescribed APIs 80.

Hence, the network operating system 56 prevents any executable resource in a physical network device 88 (or a user of the physical network device 88) from accessing any unencrypted form of any "at-rest" first secure data structures encrypted and stored by the network operation system 56 in the physical network device 88, without authorized access via a prescribed API 80. The network operating system 56 also prevents any executable resource in the physical network device 88 (or a user of the physical network device 88) from accessing any unencrypted form of any "in-flight" second secure data structures encrypted and stored by the network operation system 56, without authorized access via a prescribed API 80. The network operating system 56 also prevents any executable resource in the physical network device 88 (or a user of the physical network device 88) from accessing the secure peer-to-peer data network, without authorized access via a prescribed API 80 required by the network operating system 56.

Hence, the network operating system 56 establishes a "closed" access system that requires authorized access via one or more of the APIs 80.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 5), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections via the pairwise topology 98 of replicator devices 16, resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a P2P link), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58 (overlying the 5G smart phone execution of the secure private core network operations 56 as a "network operating system" app) for establishment of the secure data network 5 as a private peer-to-peer network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint—replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto-signed switching described below. Hence, each endpoint device 12 can be connected to another endpoint device by zero logical hops (pure peer-to-peer (P2P) connection "A-A1" in FIG. 1), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission or reception ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the secure network services 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service (i.e., guardian security agent) 66, sentinel service (i.e., sentinel security agent) 68, and navigator service (i.e., navigator security agent) 70 executed as part of the AI-based security service 64 in the secure network services 76 are scalable in that every physical network device can execute the various services 66, 68, and 70 at a scale corresponding to the associated application operations 58 of the physical device executing the associated application layer resources 58; hence, executable agents 66, 68, and 70 operating in one endpoint device (e.g., "A" 12) can securely communicate and share metadata (e.g., feature data such as cyber-attack feature data, wireless network feature data, etc.) with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
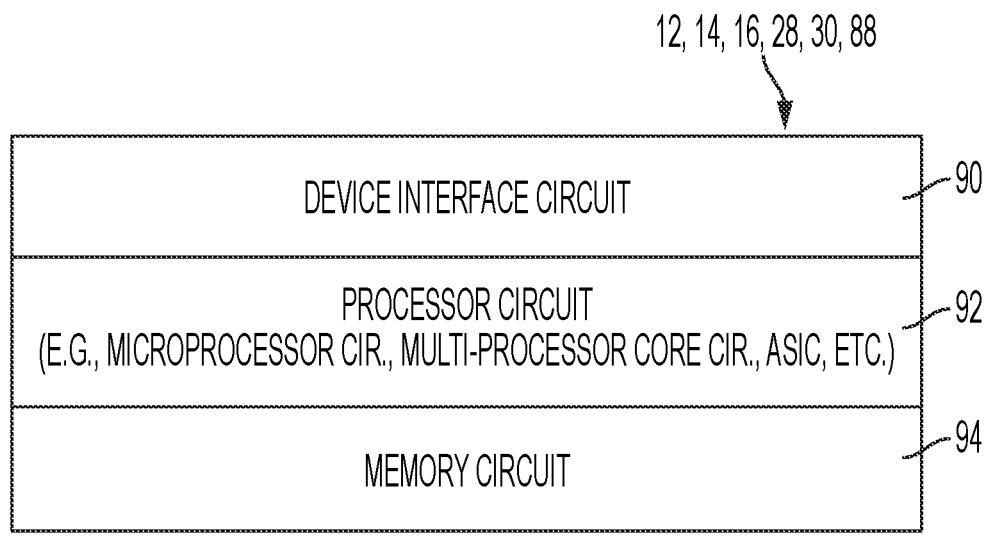
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships

The example embodiments enable the secure establishment of universally-unique identities in a secure peer-to-peer data network 5 that is established based on an aggregation of two-way trusted relationships, all under the control of the AI based security suite 64. The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device, under the control of the AI based security suite. Hence, a requesting user can aggregate a "federation" of trusted endpoint devices for use within the secure peer-to-peer data network.

Moreover, each endpoint device can uniquely and securely identify itself based on the AI based security suite cryptographically generating a secure private key and a corresponding secure public key associated with the requesting party utilizing the endpoint device. Hence, data storage in each and every network device in the secure peer-to-peer data network, as well as all network communications between each and every network device, can be secured by the guardian security agent based on sharing secure public keys between endpoint devices having established a two-way trusted relationship based on a secure verification of membership within the same "federation" according to a prescribed secure salutation protocol under the control of the AI based security suite.

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "Key_X"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2") devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5:
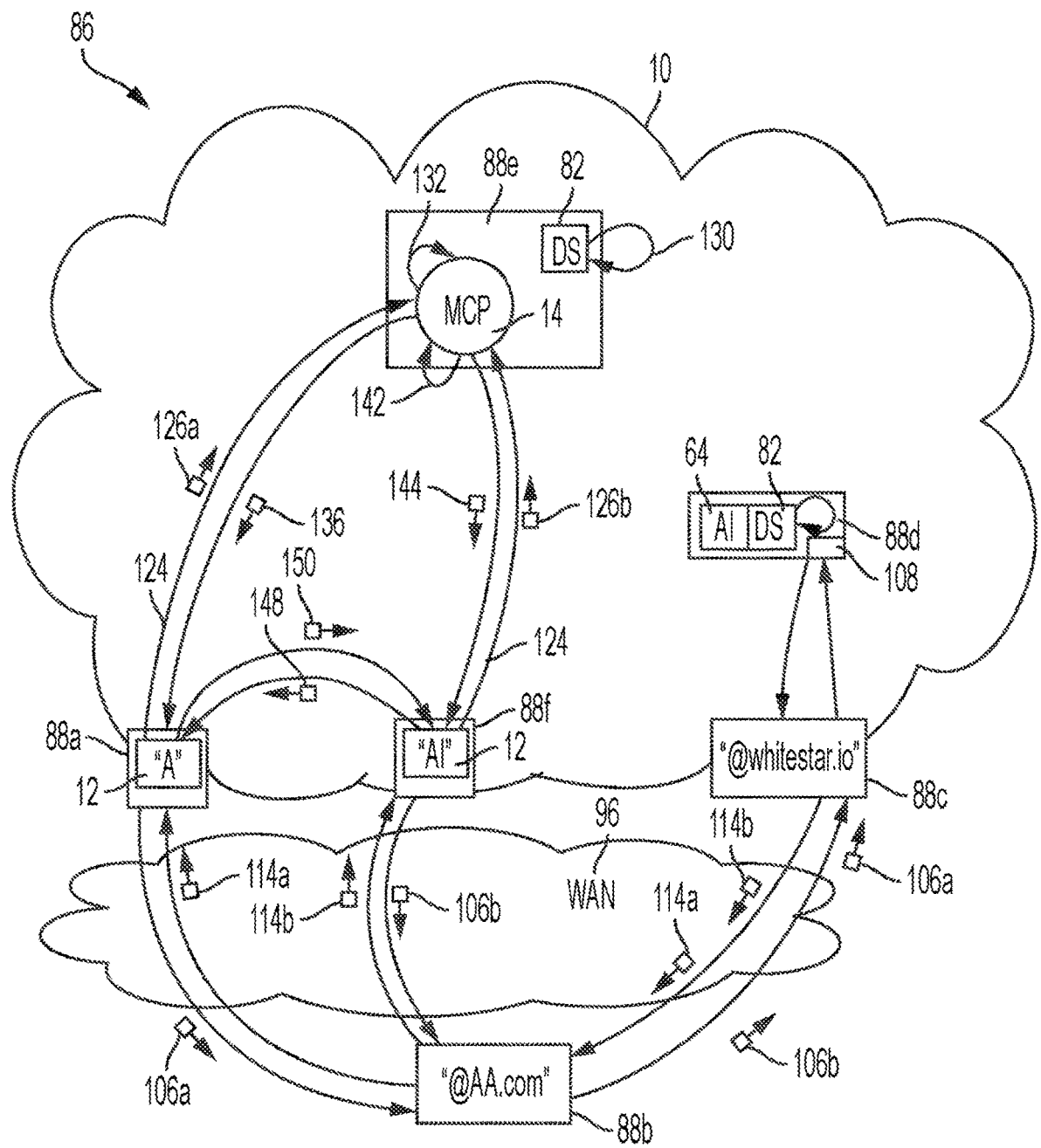
FIG. 5 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIG. 5 illustrates an example identity management system 86 that can be implemented in the secure private core network 10 for secure establishment of trusted relationships in the secure data network 5, according to an example embodiment. A new subscriber "P1" can operate his or her physical network device (88*a* of FIG. 5) to cause the processor circuit 92 of the physical network device 88*a* to download and install, for example via an external data network 96 distinct from the secure peer-to-peer data network 5, an executable application (e.g., an "app") that includes a desired application (e.g., a messenger application 72 of FIG. 3) and the network operating system (NOS) 56. The new subscriber "P1" as a "requesting party" can enter via the device interface circuit 90 of the physical network device 88*a* a command that causes the processor circuit 92 to start ("instantiate") the executable application executing the secure private core network operations 56 on the physical network device 88*a* as an endpoint device "A" 12, causing an account management service executed in the secure network services 76 to prompt the new subscriber "P1" to register by entering an external network address such as a valid email address of the new subscriber "P1" (e.g., "P1@AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88*a*) receiving the request by the user "P1" to register the physical network device 88*a* as an endpoint device "A" 12, including the external network address (e.g., "P1@AA.com") of the user "P1", the processor circuit 92 of the physical network device 88*a* executing the account management service in the secure network services 76 on the endpoint device "A" 12 can respond to the external network address entry (e.g., email address) by causing the secure network services 76 to generate a unique private key "prvKeyP1_A" and a public key "KeyP1_A" for the requesting party "P1" on the new endpoint device "A" 12. The account management service executed in the secure network services 76 by the processor circuit 92 on the endpoint device "A" 12 can generate and send a registration request (containing the secure public key "KeyP1_A") 106*a* to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88*a* can output, via the external data network 96, the registration request 106*a* received from the processor circuit 92 executing the NOS 56 for transmission, via the external data network 96, to a physical network device 88*b* hosting a messaging service (e.g., email server "@AA.com") for the subscriber "P1"; the messaging server 88*b* can forward the message 106*a*, via the external data network 96, to a physical network device 88*c* hosting a messaging service (e.g., email server "@whitestar.io") associated with the secure private core network 10 of the secure peer-to-peer data network 5.

The prescribed destination 108 of the registration request 106*a* can be hosted by the same physical network device 88*c* receiving the registration request 106*a* from the transmitting messaging server 88*b* or a different physical network device (e.g., 88*d*) in the secure private core network 10 (e.g., within a replicator device 16). The physical network device (e.g., 88*c* or 88*d*) hosting the prescribed destination 108 can cause its processor circuit 92 to execute a distributed search (DS) agent 82 in order to execute fraud control using the AI-based security service 64, including determining whether the external network address (e.g., email address "P1@AA.com") specified in the registration request 106*a* has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88*c* or 88*d*) having received the registration request 106*a* can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88*c* or 88*d*) that executed the fraud control can validate that the external network address can be trusted: in response, the distributed search (DS) agent 82 can cause the secure private core network 10 to generate and send a validation response (e.g., email message, text message, etc.) 114*a* to the external network address of the new subscriber "P1" (e.g., email "P1@AA.com" hosted by the physical network device 88*b*) via the external data network 96, where the validation message 114*a* can include the secure public key "KeyP1_A" generated by the secure network services 76 on the new device "A" 12: the secure public key "KeyP1_A" supplied in the registration request can be expressed in the validation message 114*a* in different forms, for example a QR code, a URL, or a text string.

Hence, the new subscriber "P1" can utilize the physical network device 88*a* (or another physical network device 88, as appropriate) to retrieve the validation response from the messaging server 88*b* "out of band" (i.e., outside the secure private core network 10): the validation response 114*a* specifies instructions enabling the new subscriber "P1" to submit the secure public key "KeyP1_A" for validation by the secure network services 76 executed on the new device "A" 12, for example in the form of a machine readable QR code, a URL link, or a machine-readable text string.

In response to the secure network services 76 executed on the new device "A" 12 (by the processor circuit 92 of the physical network device 88*a*) verifying the secure public key "KeyP1_A" in the validation response 114*a*, the secure network services 76 executed on the new device "A" 12 can register the physical network device 88*a* as the endpoint device "A" 12 based on auto-generating (crypto-generating) a federation ID "F1" 18 that is allocated to the email address "P1@AA.com" used by the subscriber "P1", thereby establishing a relationship between the email address "P1@AA.com" and the endpoint device "A" 12. The network operating system 56 executed in the endpoint device "A" 12 (within the physical network device 88*a*) executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A"; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88a is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88a) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 also can generate a cryptographic nonreversible hash of the external network address (e.g., email address "P1@AA.com"), for example "HASH [P1@AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 can identify the MCP device 14 as a prescribed management agent in the secure peer-to-peer data network 5, establish a connection with the MCP device 14 (e.g., via an IP address that is made available to the network operating system executed in the endpoint device "A" 12), and generate and supply a registration message 126a comprising its cryptographic nonreversible hash (e.g., its hashed email address "HASH[P1@AA.com]"), its federation ID "F1" 18, and its endpoint ID "EID_A" that is owned by the federation ID "F1" (e.g., "HASH[P1 @AA.com]→F1" and "F1→['EID_A']") (the network operating system 56 executed in the endpoint device "A" 12 also can include its public key "KeyP1_A"). The registration message also can include one or more network addresses (e.g., IP addresses) used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairP1_A"), where the network operating system 56 executed in the endpoint device "A" 12 can generate multiple private/public key pairs having respective aliases, for example different cohorts, different data flows, etc.

The processor circuit 92 of the physical network device 88e executing the MCP device 14 can respond to receiving the registration message 126a by causing its distributed search (DS) agent (82 of FIG. 1) to execute a projection search on the supplied identifiers "HASH[P1 @AA.com]", "F1" 18 and/or "EID_A" 20 to determine if there are any matches. For example, the distributed search (DS) agent 82 can execute a projected search of the cryptographic nonreversible hash "HASH[P1@AA.com]" to determine if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches, the MCP device 14 can register the new federation 34. Hence, the registration message 126a enables the MCP device 14, as the prescribed management agent for the secure data network 5, to associate the federation ID "F1" 18 as owning the cryptographic hash "HASH[P1 @AA.com]" and the endpoint identifier "EID_A" 20; the registration message 126a further enables the MCP device 14 to associate the secure public key "KeyP1_A" with the endpoint identifier "EID_A" 20 owned by the federation ID "F1" 18. As described below, the registration message enables the MCP device 14 to generate and store a data structure, referred to as a "signet", that comprises the secure public key "KeyP1_A" of the endpoint device "A" 12, the "alias" used by the endpoint device "A" 12, a list of one or more network addresses (e.g., IP addresses) usable by the endpoint device "A" 12 for communications via an underlying data network 96 used as a multi-hop transport layer 60, and the endpoint ID "EID_A" 20 of the endpoint device "A" 12.

The MCP device 14, in response to determining there are no matches on the supplied identifiers "HASH[P1 @AA.com]", "F1" 18 and/or "EID_A" 20 (indicating an absence of any previous use of the cryptographic nonreversible hash), can acknowledge the registration message based on generating and sending to the endpoint device "A" 12 a secure registration acknowledgment 136 indicating that there are no other endpoints, and can include a public key "Key_MCP" of the MCP device 14; the MCP device 14 can encrypt the public key "Key_MCP" with a temporal key (resulting in the encrypted data structure "ENC(Key_MCP) "), encrypt the temporal key with the secure public key "KeyP1_A" of the endpoint device "A" 12, and supply the encrypted temporal key "ENC(TK)" in the secure registration acknowledgment 136 with the encrypted data structure "ENC(Key_MCP)" to the endpoint device "A" 12. The supplied identifiers "HASH[P1 @AA.com]", "F1" and "EID_A" also can be supplied by the MCP device 14 to the directory server 28 for subsequent projection searches in the secure private core network 10.

The network operating system 56 of the endpoint device "A" 12 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network.

Hence, at this stage the federation object 32 contains only the endpoint object 22 having an endpoint ID "E1" 20 that uniquely identifies the endpoint device "A" 12 used for initial registration with the secure private core network 10.

The same user "P1" can register a physical network device 88f as a new device "A1" 12 based on installing and instantiating the network operating system 56 on the physical network device 88f, and entering the same external network address (e.g., email address "P1 @AA.com") of the subscriber "P1" in response to a prompt by the account management service executed in the secure network services 76 of the network operating system 56; the account management service executed in the secure network services 76 on the physical network device 88f can respond to reception of the external network address (e.g., email address "P1 @AA.com") by causing the secure network services 76 to generate a unique private key "prvKeyP1_A1" and a public key "KeyP1_A1" for the user "P1" on the new device "A1" 12, and generate and send the registration request (containing the secure public key "KeyP1_A1") 106b to the prescribed destination (e.g., "registerme@whitestar.io") 108 associated with the secure peer-to-peer data network 5.

As described previously, receipt of the registration request 106b causes a physical network device (e.g., 88c or 88d) executing the distributed search (DS) agent 82 in the secure per-to-peer data network 5 to execute fraud control, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear", and can generate and send a validation response 114b to the external network address (e.g., email address "P1@AA.com") of the subscriber "P1", where the validation response can include the secure public key "KeyP1_A1" generated by the secure network services 76 on the new device "A1" 12.

The subscriber "P1" can receive the validation response 114b that specifies instructions (e.g., QR code, URL, text string, etc.) for submitting the included secure public key "KeyP1_A1" for validation. In response to the secure network services 76 executed on the new device "A1" 12 verifying the secure public key "KeyP1_A1" in the validation response 114b, the secure network services 76 executed on the new device "A1" 12 can (temporarily) auto-generate a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" to create a new password for entry into the secure data network 5 via the new device "A1" 12, and by auto-generating (crypto-generating) an endpoint ID 20 for the endpoint device "A1" 12 that is a 128 bit UUID (e.g., "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1") 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate a cryptographic nonreversible hash of the external network address (e.g., the email address "P1@AA.com"), e.g., "HASH[P1@AA.com]", connect to the MCP device 14 (e.g., via an IP address that is made available to the network operating system executed in the endpoint device "A1" 12), and supply a registration message 126b.

The registration message 126b generated by the endpoint device "A1" 12 can specify the cryptographic nonreversible hash "HASH[P1 @AA.com]", its federation ID "FA1" 18, and its endpoint ID "EID_A1" that is owned by the federation ID "FA1" (e.g., "HASH[P1 @AA.com] 4 FA1" and "FA1→['EID_A1']") (the network operating system 56 executed in the endpoint device "A" 12 also can include its public key "KeyP1_A1"). The network operating system 56 executed in the endpoint device "A1" 12 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 by causing its distributed search (DS) agent 82 to execute a projection search on the supplied identifiers "HASH[P1 @AA.com]", "FA1" and/or "EID_A1".

In response to determining a match on the cryptographic nonreversible hash "HASH[P1 @AA.com]", the distributed search (DS) agent 82 can cause the MCP device 14 to generate and output to the endpoint device "A1" 12 a secure endpoint acknowledgment 144 indicating another endpoint device "A" 12 exists in its federation 34; the acknowledgment generated also can include the signet of the endpoint device "A" 12 that is already a member of the same federation 34. The signet of the endpoint device "A" 12 can include: the secure public key "KeyP1_A" of the endpoint device "A" 12, an "alias" used by the endpoint device "A" 12, reachability information such as a list of one or more IP addresses usable by the endpoint device "A" 12, and the endpoint ID 20 of the endpoint device "A" 12.

As described previously, the MCP device 14 can encrypt the endpoint acknowledgment (containing the signet of the endpoint device "A" 12 and the secure public key "Key_MCP") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH [P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 enables the guardian security agent 66 in the network operating system 56 executed in the endpoint device "A1" 12 to decrypt the temporal key, decrypt the acknowledgment, and obtain the secure public key "Key_MCP" of the MCP device 14.

The guardian security agent 66 in the network operating system 56 executed in the endpoint device "A1" 12 can respond to the decrypted acknowledgment (specifying another endpoint is a member of the same federation 34, and that contains the signet for the endpoint device "A" 12) by initiating a prescribed secure salutation protocol with the endpoint device "A" 12. In particular, the secure network service 76 executed in the endpoint device "A1" 12 can generate and send, based on the received signet, a secure salutation request 148 identifying its endpoint ID "EID_A1" 20 and requesting a relationship with the endpoint device "A" 12; the salutation request can be encrypted using the secure public key "KeyP1_A" of the endpoint device "A" 12, and can include the alias (associated with the secure public key "KeyP1_A"), and also can include the secure public key "KeyP1_A1" of the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance).

Hence, the network operating system 56 executed in the endpoint device "A1" 12 can determine from the endpoint object 22 of the endpoint device "A" 12 specified in the secure salutation reply 150 received that the endpoint object 22 specifies a federation ID "F1" 18: the federation ID "F1" 18 in the endpoint object 22 in the salutation acceptance 150 causes the network operating system 56 in the endpoint device "A1" 12 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID from "FA1" to "F1" in its endpoint object 20, and discard the initial federation ID "FA1". Consequently, the network operating system 56 in the endpoint device "A1" 12 adopts the federation ID "F1" 18, thus establishing the identity of the owner of the devices "A" and "A1" as federation"F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 32 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52.

According to example embodiments, an identity management system ensures establishment of trusted two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network.

Distributed Crypto-Signed Switching in a Secure Peer-to-Peer Network

The secure storage and transmission of data structures can be extended between different "federations" of network devices, including endpoint devices (established by different users having established respective two-way trusted relationships with the secure peer-to-peer data network), and replicator devices, according to the prescribed secure salutation protocol under the control of the AI based security suite 64. Hence, crypto-signed switching can be enabled between two-way trusted network devices in a secure peer-to-peer data network, according to the prescribed secure salutation protocol under the control of the AI based security suite. Additional security-based operations can be deployed in a scalable manner in the secure peer-to-peer data network, based on the distributed execution of the AI-based security suite 64.

The guardian security agent 66 can secure (i.e., encrypt) all "at-rest" data structures as first secure data structures for secure storage in the network device, for example based on encrypting each "at-rest" data structure with a corresponding private key: for example, the guardian security agent 66 executed in the endpoint device "A" 12 can secure the "at-rest" data structures using the private key "prvKeyP1_A" that can be dynamically generated by the guardian security agent 66 during initialization of the network operating system 56. The guardian security agent 66 (executed, for example, by the endpoint device "A" 12) also can secure "in-flight" data structures as second secure data structures based on dynamically generating a temporal key "TK", and encrypting the temporal key 68 with a public key (e.g., "Key_B") of a destination device (e.g., the endpoint (device "B" 12, ensuring secure communications in the secure peer-to-peer data network 5. Additional details regarding encrypting "at rest" data structures and "in-flight" data structures are described below, and are also disclosed in the above-incorporated U.S. Publication No. 2021/0028940.

In particular, the guardian security agent 66 of a source network device (e.g., an endpoint device "A" 12) can encrypt an "in-flight" data packet into a secure data packet based on dynamically generating a unique temporal key (e.g., "TK") used for encrypting a data packet payload into an encrypted payload, and encrypting the unique temporal key into an encrypted temporal key (e.g., "ENC(Key_B)[TK]") using a secure public key (e.g., "Key_B") of a destination device (e.g., endpoint device "B" 12) identified within a destination address field (e.g., "DEST=B"). In other words, the guardian security agent 66 of the source endpoint device dynamically generates a new temporal (e.g., time-based) key "TK" for each secure data packet to be transmitted, ensuring no temporal key is ever reused; moreover, the encrypted temporal key ensures that only the destination device can decrypt the encrypted temporal key to recover the temporal key used to encrypt the payload.

The guardian security agent 66 of a source network device (e.g., an endpoint device "A" 12) also can digitally sign the packet (containing the encrypted payload and encrypted temporal key) using the endpoint device A's private key "prvKeyP1_A" to generate a source endpoint signature. Hence, the guardian security agent 66 can generate the secure data packet for secure "in-flight" communications in the secure peer-to-peer data network 5.

Figure 6:
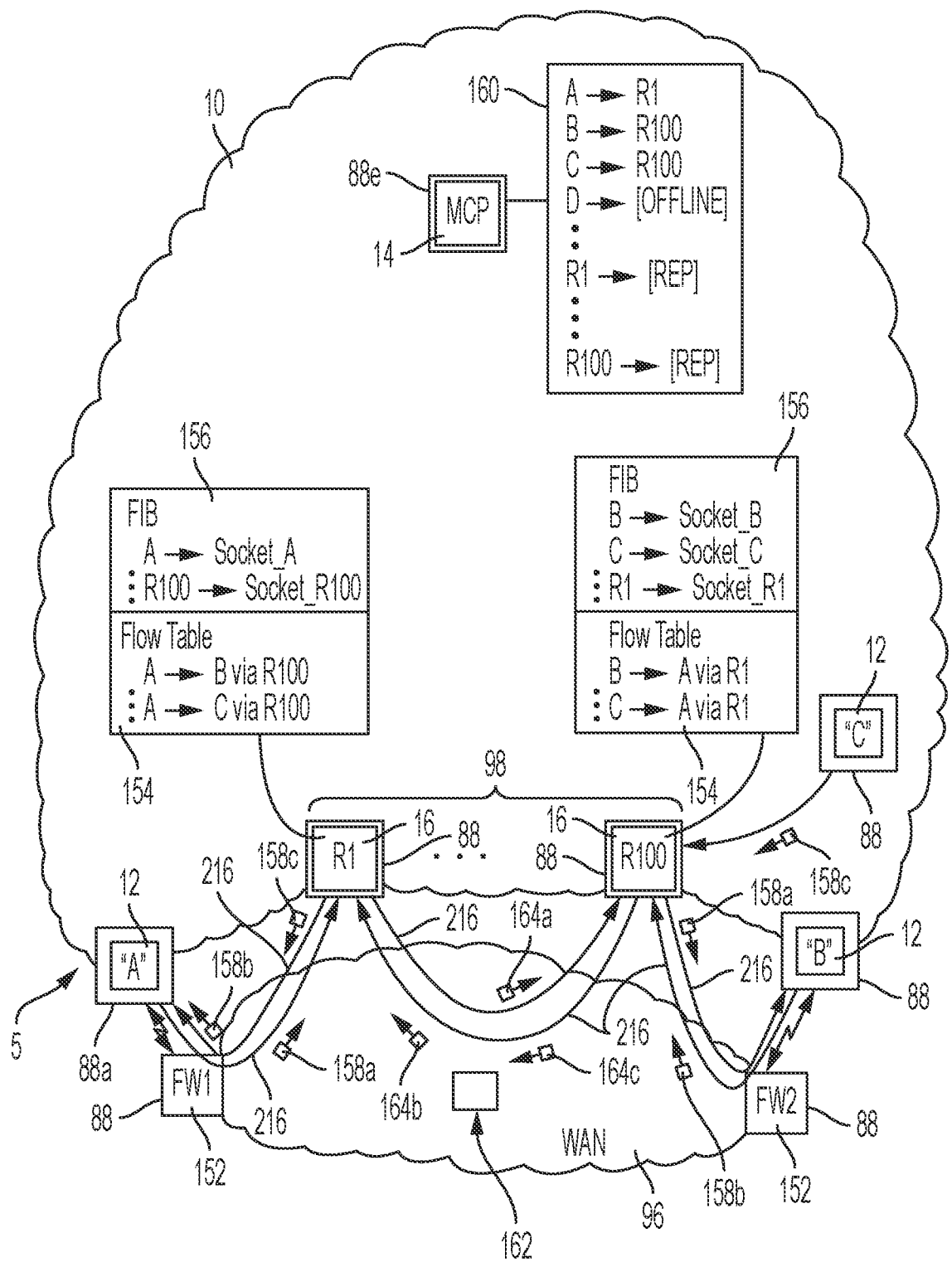
FIG. 6 illustrates crypto-signed switching between two-way trusted network devices in a secure peer-to-peer data network, according to an example embodiment.

The source endpoint signature generated by the guardian security agent 66 in the source network device (e.g., the endpoint device "A" 12) enables the guardian security agent 66 of a receiving network device (e.g., the replicator device "R1" 16, and/or the endpoint device "B" 12 of FIG. 6) in possession of the public key "KeyP1_A" to validate that the secure data packet is from the endpoint device "A" 12. The guardian security agent 66 of the receiving network device also can validate an incoming secure data packet based on determining that the receiving network device (e.g., the replicator device "R1" 16, and/or the endpoint device "B" 12 of FIG. 6) has a trusted two-way relationship with the source network device as described above, where the source network device can be identified by the source address field "SRC=A".

Hence, the guardian security agent 66 of a receiving network device (e.g., the replicator device "R1" 16 or the endpoint device "B" 12 in FIG. 6) can validate an identity for a received secure data packet 158, based on validating a source endpoint signature using the corresponding public key (e.g., "KeyP1_A") of the source network device (e.g., the endpoint device "A" 12), and based on the guardian security agent 66 of the receiving network device determining that it has a trusted two-way relationship with the source network device identified in the source address field.

The guardian security agent 66 of each of the replicator devices "R1" and "R100" 16 also can enforce crypto-signed switching based on validation of a replicator signature. In particular, following validation of the secure data packet 158, the guardian security agent 66 of the replicator device (e.g., "R1") 16 can cryptographically sign the secure data packet, using its private key "prvKey_R1" to generate a replicator signature for secure transmission to its trusted peer replicator device "R100" 16 as a secure forwarded packet (e.g., 164a) containing the secure data packet (e.g., 158a) and the replicator signature, ensuring no network node 162 in the underlying external data network 96 can decrypt the secure data packet (e.g., 158a) contained in the secure forwarded packet (e.g., 164a).

Similarly, the guardian security agent 66 of a replicator device (e.g., "R100") 16 can determine that the cryptographically-signed secure forwarded packet (e.g., 164a of FIG. 6) is received from a trusted peer replicator device (e.g., "R1") 16, and can execute validation of the secure forwarded packet (e.g., 164a) based on verifying the replicator signature in the secure forwarded packet using the public key "Key_R1" of the replicator device "R1" 16. As described below, the guardian security agent 66 and/or the sentinel security agent 68 of the replicator device (e.g., "R100") can verify the secure forwarded packet is not a replay attack. The replicator device (e.g., "R100") can respond to successful validation of the secure forwarded packet (containing the secure data packet 158a) by forwarding the secure data packet (e.g., 158a) to its attached destination endpoint device (e.g., "B") 12, maintaining the cryptographic security of the secure data packet (e.g., 158a) for decryption by the attached destination endpoint device "B" 12 following validation of the secure data packet (e.g., 158a) by the guardian security agent 66 in the destination endpoint device "B" 12.

Hence, the guardian security agent 66 can validate identities for establishment and enforcement of all two-way trusted relationships, including during execution of the prescribed secure salutation protocol as described previously.

The secure network services 76 executed in each physical network device 88 also includes a sentinel service 68. The sentinel service 68 is implemented in each physical network device 88 as executable code (e.g., an executable "agent") within the secure network services 76; hence, the sentinel service 68 also can be referred to herein as a sentinel agent 68.

The navigator security agent 70 of an endpoint device (e.g., the endpoint device "A" 12) can enable secure communications to be established through a firewall (e.g., "FW1" 152 of FIG. 6) of a locally-utilized wireless data network, based on establishing a two-way trusted relationship with a replicator device (e.g., "R1" 16) in the secure peer-to-peer data network 5, for example according to the prescribed secure salutation protocol. As illustrated in FIG. 6, the "mesh" 98 of interconnected replicator devices 16 enables the replicator device "R1" 16 to provide reachability to the destination network device "B" via a second replicator device "R100" 16.

In particular, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing the guardian security agent 66 of each replicator device 16, during registration with the MCP device 16, to execute a prescribed secure salutation protocol with each and every other replicator device 16 in the secure private core network 10. The MCP device 14 also causes the guardian security agent 66 of each endpoint device 12, during registration with the MCP device 16 (or in response to the endpoint device 12 returning from an "offline state" to an "online" state), to establish a two-way trusted relationship with an identified replicator device (selected by the MCP device 16) based on executing a prescribed secure salutation protocol with the identified replicator device 16; hence, the navigator security agent 70 executed in the endpoint device "A" 12 can create an entry specifying that a replicator device is reachable via an identified wireless data link between the endpoint device "A" 12 and the firewall device "FW1" 152.

The MCP device 14 also can identify, for a requesting replicator device (e.g., "R1") 16, a peer trusted replicator device (e.g., "R100") 16 for reaching a destination endpoint device (e.g., "B"), even if the secure peer-to-peer data network 5 utilizes the external data network 96 where each endpoint device 12 can be physically located in a wireless local area network that is secured by a security appliance (e.g., a firewall device) 152, and replicator devices 16 forward secure forwarded packets 164 via the external data network 96.

The example embodiments also are particularly effective in cases where actual deployment is via an existing IP network infrastructure 96, for example where the endpoint device "A" is connected within a first private (e.g., "home 1") IP network secured by a first firewall device "FW1" 152, and the second endpoint device "B" is connected within a second private (e.g., "home 2") IP network secured by a second firewall device "FW2" 152. The navigator security agents 70 of the endpoint devices "A" and "B" can dynamically establish a secure virtualized peer-to-peer connection, using crypto-switching via the pairwise topology 98 in the secure private core network 10, in a manner that maintains security and trust and while maintaining secrecy of the data traffic as it traverses through the secure private core network 10 via the underlying external data network 96; in other words, the crypto-switching via the pairwise topology 98 ensures that no core component (e.g., replicator device 16 or the MCP device 14) is capable of detecting the contents of any payload transmitted by endpoint devices "A" or "B".

The replicator devices "R1" and "R100 16 can create a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12.

Figure 7A:
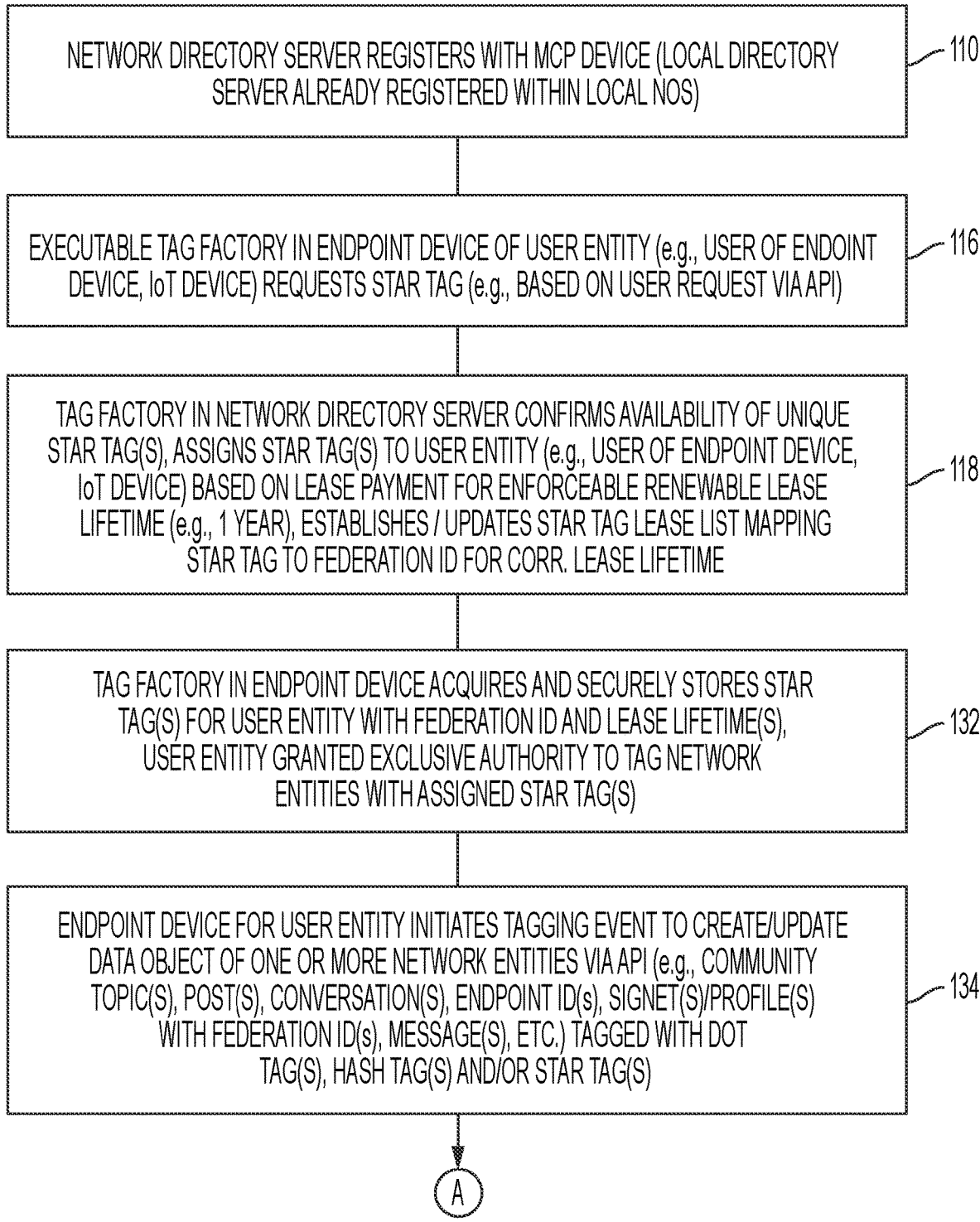
FIGS. 7A-7H summarize an example method of a directory server providing tag enforcement and content attraction in a secure peer-to-peer data network, according to an example embodiment.
Figure 7B:
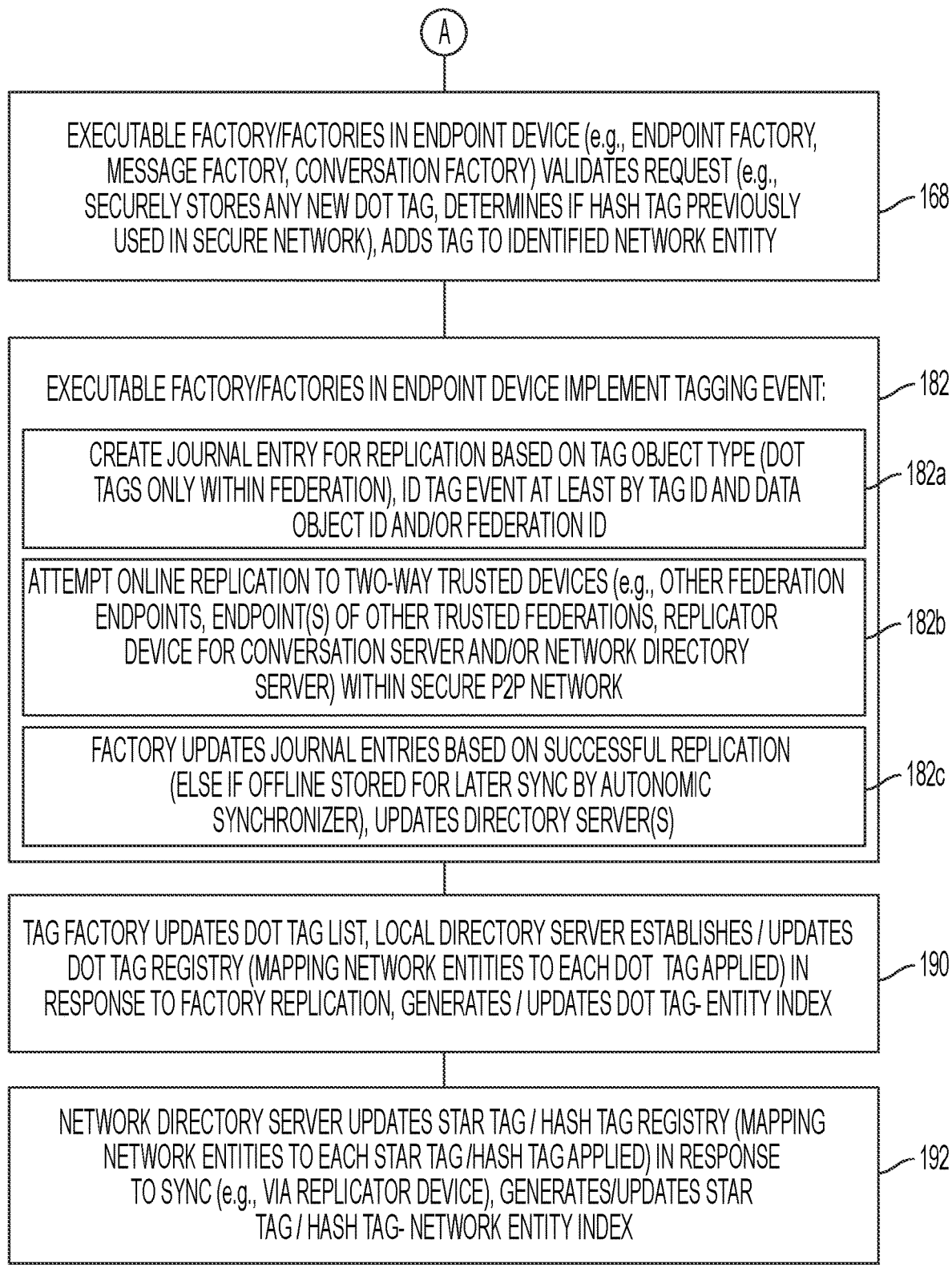
Figure 7C:
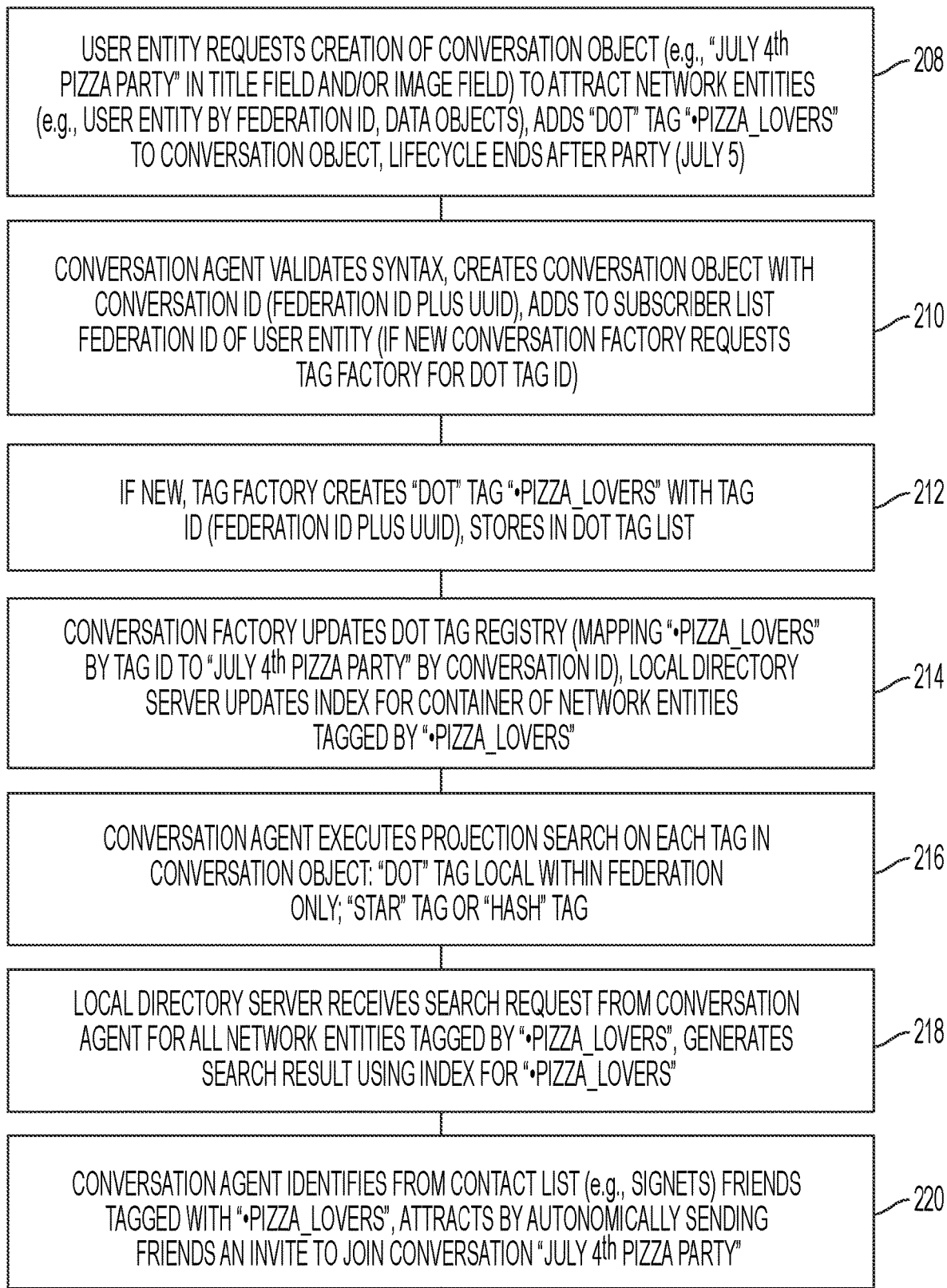
Figure 7D:
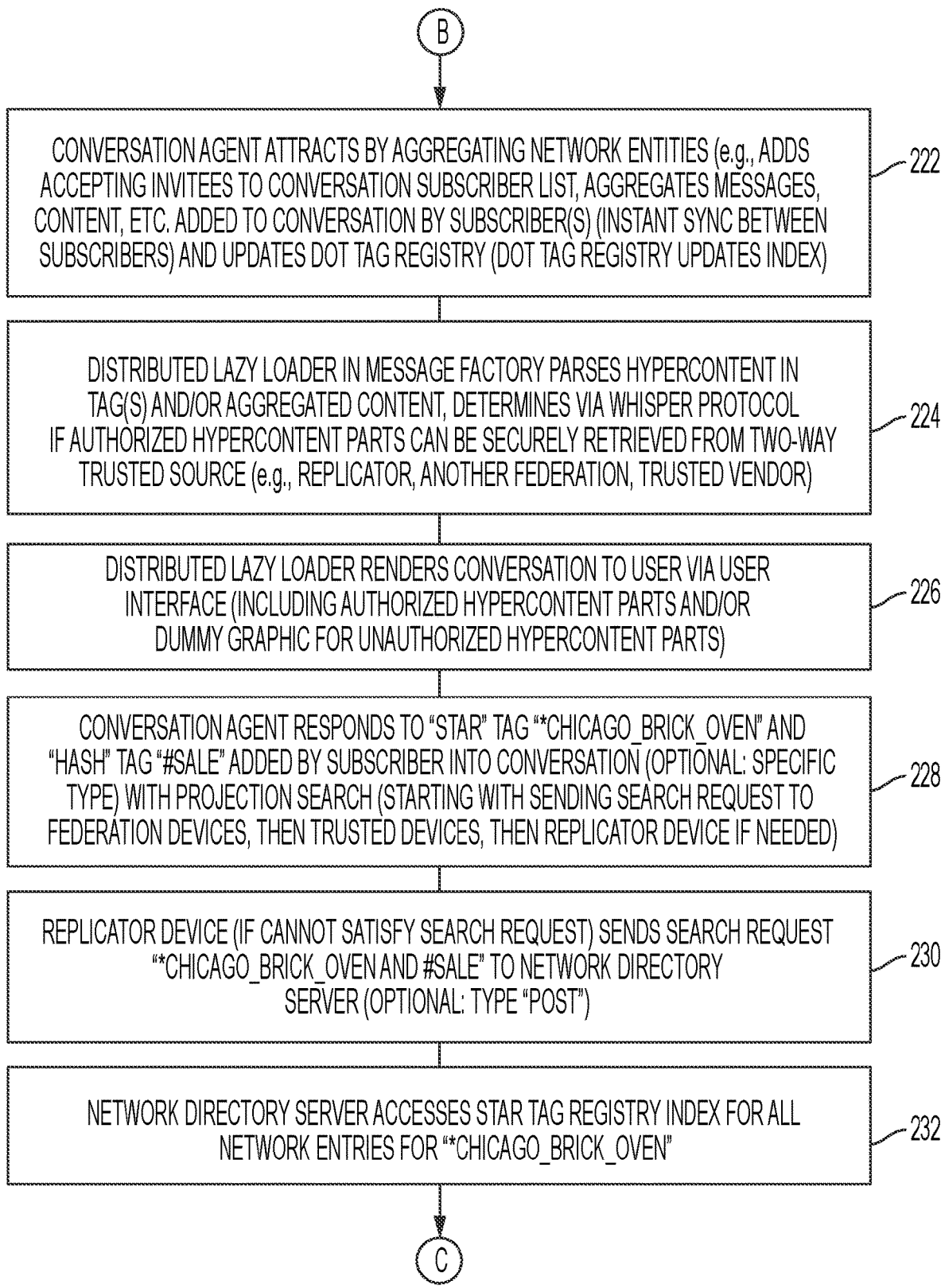
Figure 7E:
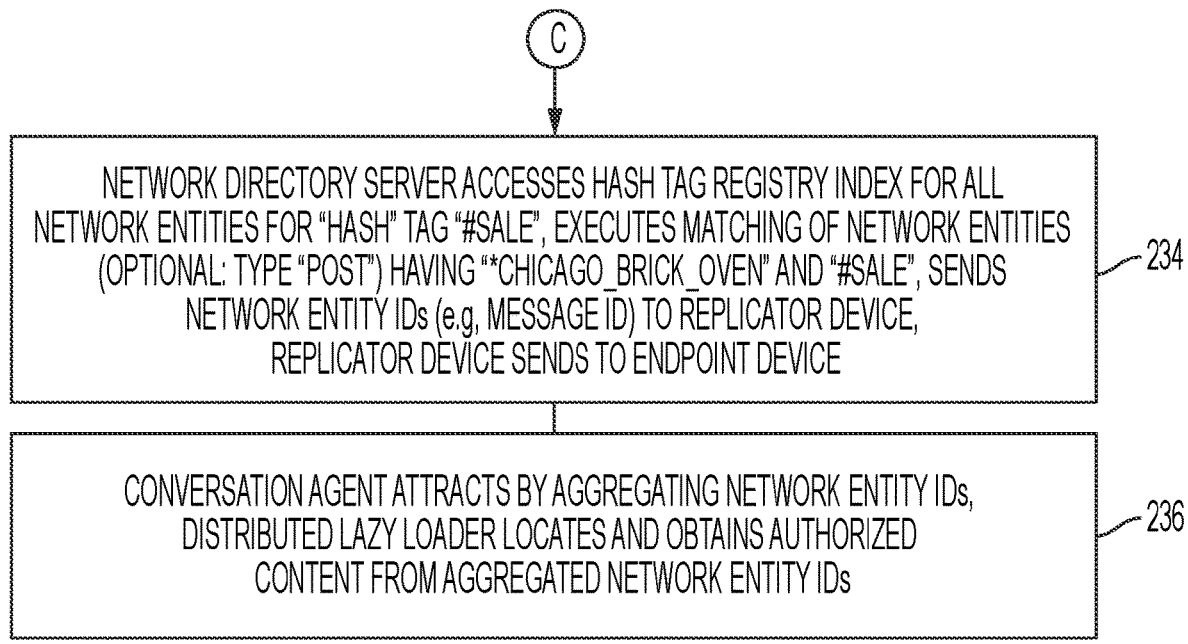
Figure 7F:
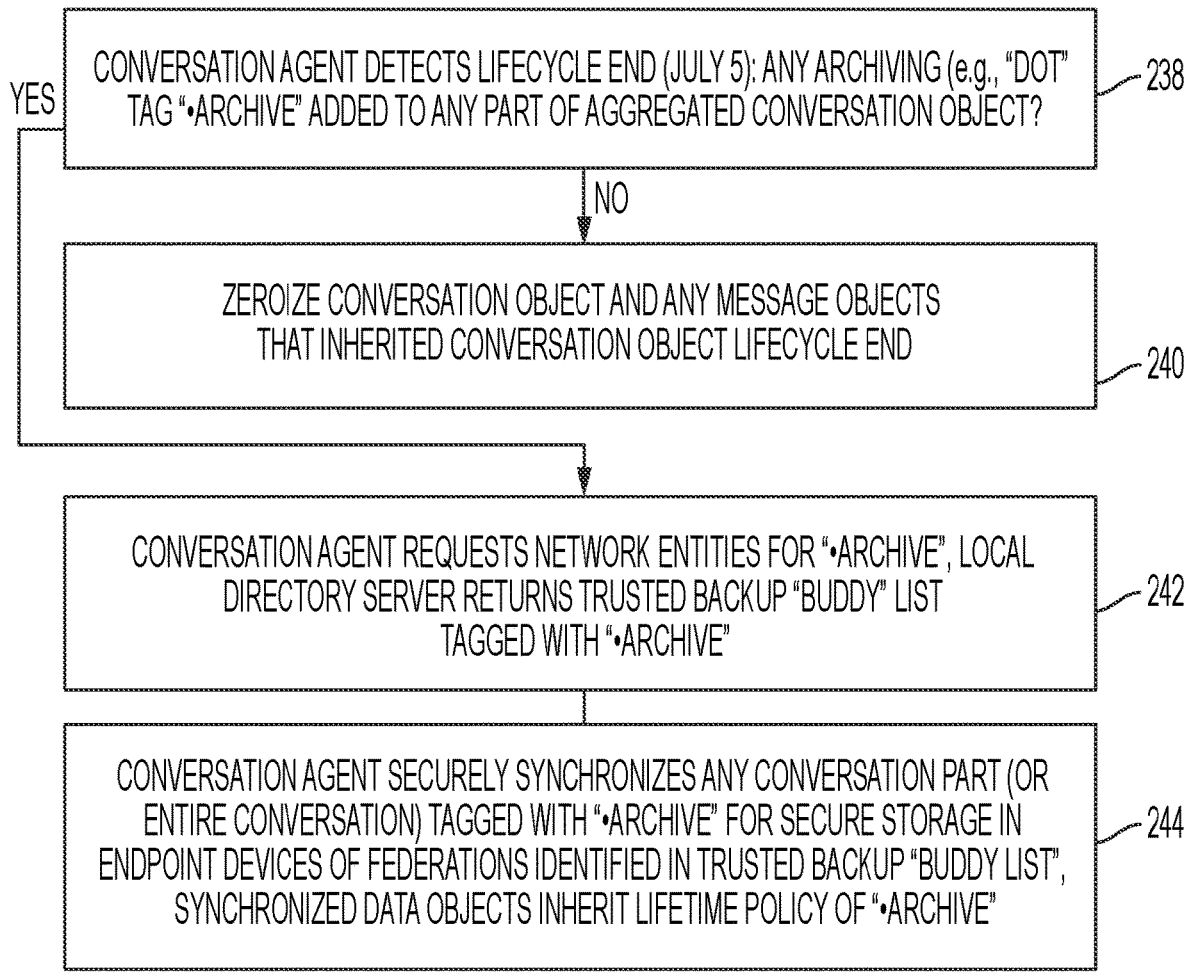
Figure 7G:
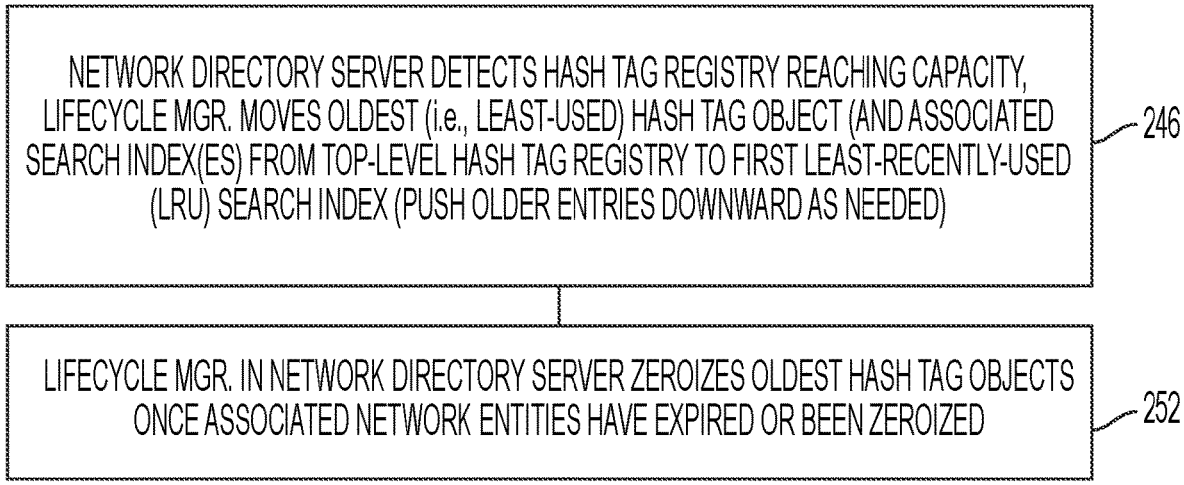
Figure 7H:
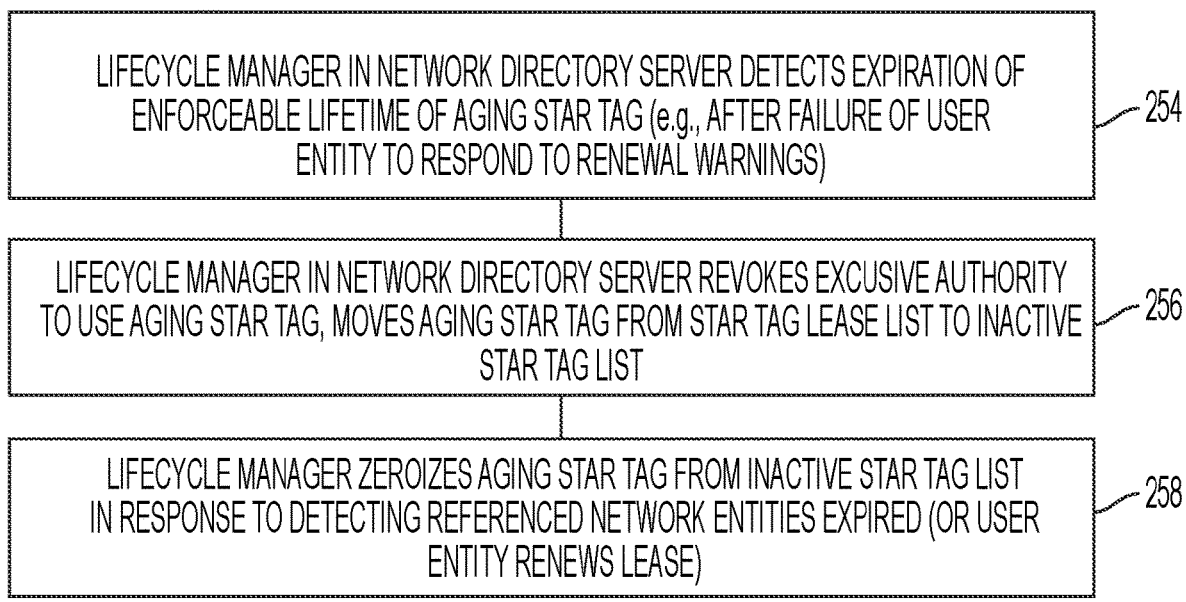
Figure 8:
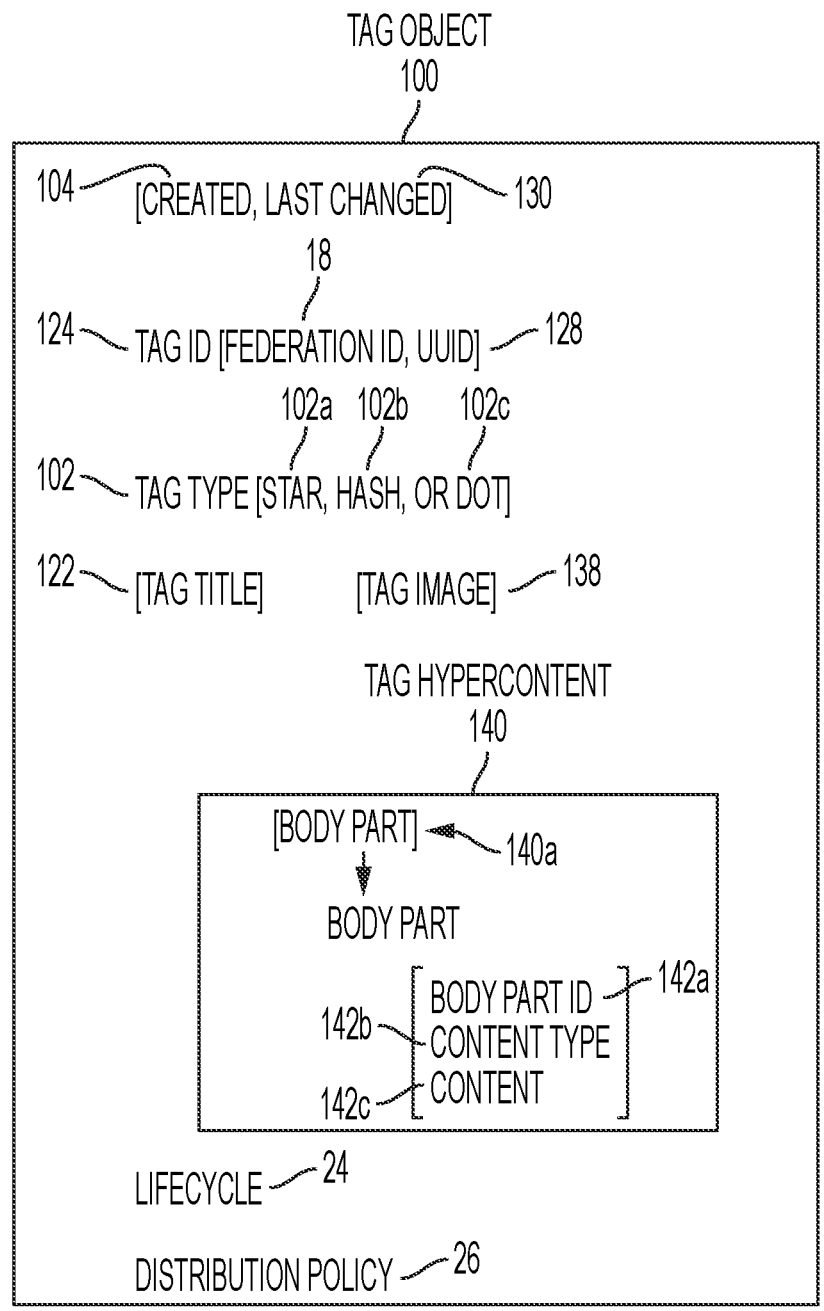
FIG. 8 illustrates an example implementation of a tag object as a stored data structure in the secure peer-to-peer data network, according to an example embodiment.

Hence, the navigator security agent 70 enables secure communications to reach endpoint devices 12 located "behind" a security appliance 152, since the endpoint device (e.g., "A") 12 can execute the prescribed secure salutation protocol with the identified replicator device 16, causing the associated secure appliance (e.g., "FW1") 152 to create a state entry that identifies the replicator device (e.g., "R1") 16, for example based on the IP address of the replicator device (e.g., "R1") 16 that is specified in the destination address field of a secure data packet (e.g., 158a of FIGS. 7 and 8). The state entry created by the security appliance 152 also can be updated in response to the endpoint device "A" 12 sending a secure data packet (e.g., 158a) to its replicator device (e.g., "R1") 16; hence, the state entry created by the secure appliance (e.g., "FW1") 152 enables the replicator device (e.g., "R1") 16 to send a second secure data packet (e.g., 158b) back to the endpoint device (e.g., "A") 12 via the secure appliance (e.g., "FW1") 152.

The sentinel security agent 68 can detect a replay attack based on executing a prescribed hash on each encrypted temporal key within a received secure data packet 158. In particular, the encrypted temporal key not only ensures that the destination device is the only network device in the secure peer-to-peer data network 5 that can decrypt the encrypted payload: the encrypted temporal key also provides for the secure data packet 174 a cryptographically-unique encrypted bitstring, also referred to herein as a "nonce" (or "nounce"), that enables any physical network device 88 receiving the secure data packet 158 to verify the secure data packet 158 is not a copy of a prior transmitted data packet (indicating a replay attack).

Hence, the sentinel security agent 68 of an endpoint device 12 can respond to receiving a secure data packet 158 (or the sentinel security agent 68 of a replicator device 16 can respond to receiving a secure forwarded data packet 164) by retrieving an encrypted bitstring from the "encrypted temporal key field", and executing its own prescribed hash (e.g., using its own unique hash parameters) to generate a hashed value of at least a portion of the encrypted bitstring (corresponding to the encrypted temporal key). The sentinel security agent 68 can compare the hashed value with other stored hash values (e.g., previously stored in a data structure within its memory circuit 94) to determine whether the hashed value equals a prior instance of a hashed value for a prescribed time interval (e.g., one minute).

It is mathematically impossible for hashes of different encrypted temporal keys to have an identical hash value unless the data packet 158 (or 164) is copied: hence, the sentinel security agent 68 executed by the processor circuit 92 of any physical network device 88 can determine that the secure data packet 158 (or 164) is not a copy based on a determined absence of a prior instance of the prescribed hash, and can continue processing the secure data packet 158, including storing the prescribed hash for future comparisons for subsequently-received secure data packets 158 or 164, for example for a corresponding identified source-destination flow.

Conversely, any sentinel security agent 68 can detect a replay attack in response to determining the prescribed hash from the received secure data packet 158 matches a prior instance of the prescribed hash on a previously-received secure data packet 158, indicating the secure data packet is a copy of a previously-received data packet.

Directory Server Providing Tag Enforcement and Network Entity Attraction

FIGS. 7A-7H summarize an example method by a directory server 28, executed in a core network device such as the MCP device 14 and/or an endpoint device 12, providing tag enforcement and content attraction in a secure peer-to-peer data network, according to an example embodiment.

FIG. 8 illustrates an example implementation of a tag object as a stored data structure in the secure peer-to-peer data network, according to an example embodiment.

Figure 10:
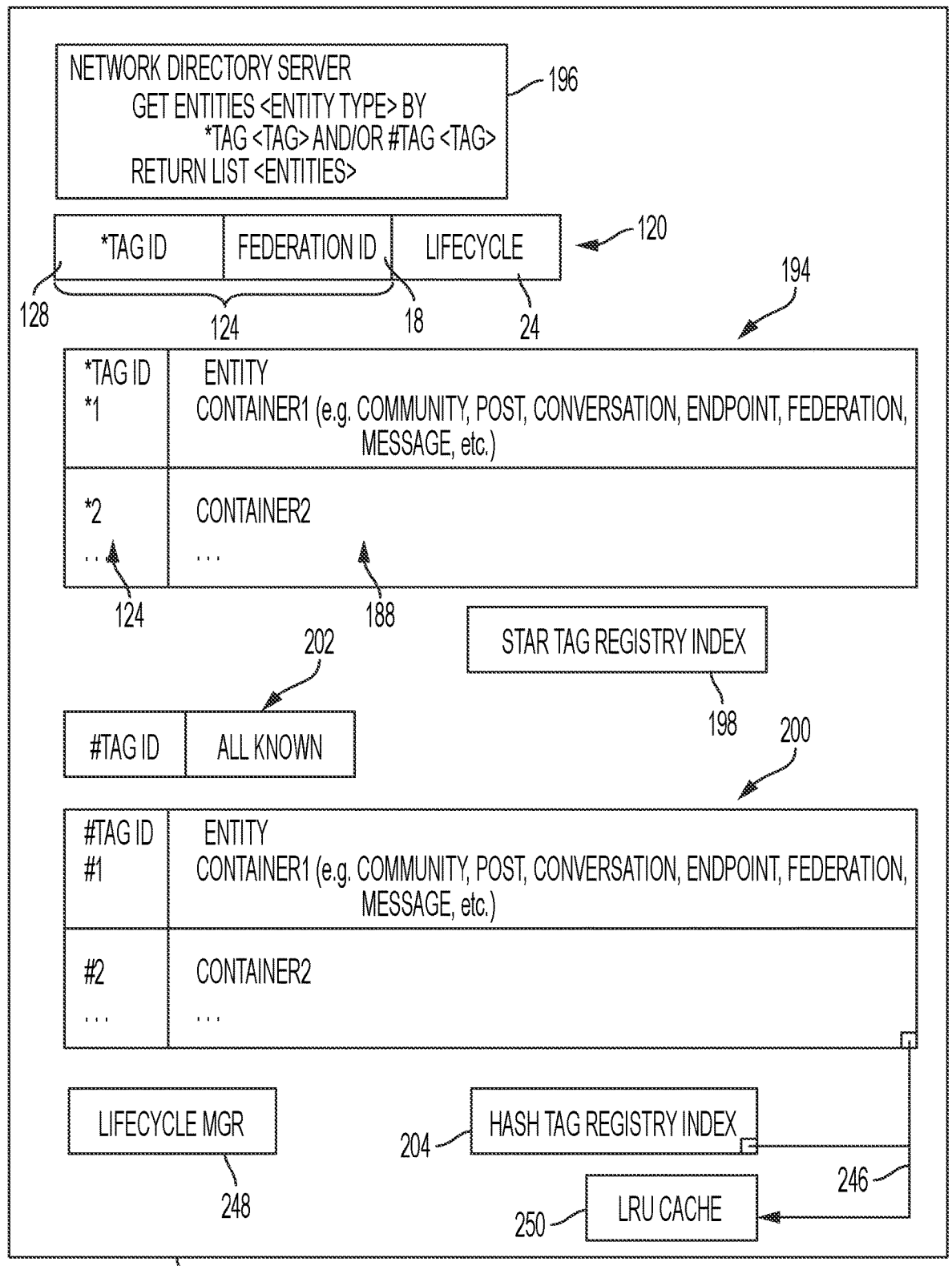
FIG. 10 illustrates an example network directory server providing in a core network device, according to an example embodiment.

FIG. 9 illustrates an example local directory server executed in an endpoint object, according to an example embodiment, FIG. 10 illustrates an example network directory server executed in a core network device, according to an example embodiment.

As described previously, the secure data network 5 is based on the establishment and aggregation of two-way trusted relationships between network devices, including between federations 34 of endpoint devices, an MCP device 14, replicator devices 16, and other physical network devices 88 that can execute various network operations, including for example a directory server 28, a community server 30, etc.

As described previously, the MCP device 14 operates as a prescribed management agent in the secure peer-to-peer data network 5. Further, the network operating system 56 operates as a secure executable container that ensures that the secure data network 5 or any secure data structure associated with the secure data network 5 or any network device (e.g., 12, 14, 16) cannot be accessed except via a prescribed access by an API 80.

Hence, the example embodiments can establish a secure ontological ("naming") system within the secure data network 5 based on the enforcement of tag objects (100 of FIG. 8) that have an enforceable scope of distribution within the secure data network 5 based on the tag object type 102. Each tag object 100 upon creation (identified by its creation timestamp 104) is permanently set as one of a "star" tag type 102a, a "hash" tag type 102b, or a "dot" tag type 102c. As used herein, a tag object 100 having a "star" tag type 102a is referred to herein as a "star tag 102a"; a tag object 100 having a "hash" tag type 102b is referred to herein as a "hash tag 102b"; and a tag object 100 having a "dot" tag type 102c is referred to herein as a "dot tag 102c".

As described below, the network operating system 56 can ensure that an endpoint device 12 can generate a dot tag 102c, and that the scope of distribution (and corresponding scope of any projection search) is limited to strictly within the endpoint devices 12 belonging to the same federation 34. Hence, the network operating system 56 (and its executable components, described below), can ensure that usage and projection search scope of a dot tag 102c is limited to a federation scope comprising one or more endpoint devices (e.g., "A", "A1") within the same federation "F1" 18, based on having the same federation ID 18. Consequently, each federation 34 can execute its own private information management using its own set of dot tags 102c.

In contrast, the star tag 102a and the hash tag 102b are managed collectively in the secured data network 5 based on the centralized management by the MCP device 14. As illustrated in FIG. 7A, a network directory server 28a (e.g., executed in the physical network device 88e or another physical network device 88 in the secure private core network 10) in operation 110 can register with the MCP device 14. The registration of the network directory server 28a with the MCP device 14 can establish the directory server 28a as having sole exclusive authority for managing star tags 102a and hash tags 102b, described below. If desired, the MCP device 14 can accept a registration for a second instance of a subordinate network directory server executed in another core network device 88 by sending a signet for the directory server 28a, enabling establishment of a federation of network directory servers in a tree-based topology, where the "root" directory server 28a can operate as the "top-level" directory server 28, and other subordinate network directory servers can execute coordinated distributed directory services "underneath" the top-level directory server 28a.

The network directory server 28a can be executed by a physical network device (e.g., 88e) having multiple processor cores in its processor circuit 92. In one example, the directory server 28a has been implemented in a physical network device 88 comprising one hundred ninety two (192) processor cores, enabling parallel execution of one hundred ninety two executable "shards" for distributed parallel execution by the directory server 28a of "search" (or "lookup") operations from indexed entries: the parallel execution of one hundred ninety two (or more) "shards" has enabled the network directory server 28a to be implemented as having a hierarchal layer of sharded information in least-recently-used (LRU) caches of indexed information (described below), enabling each hierarchal layer of an LRU cache to be utilized as a micro-service that can be networked across different physical network devices 88 in the secure private core network 10.

In addition to the network directory server 28a, an endpoint device 12 can initiate local execution of a local directory server 28b (at the application layer 58), causing the local directory server 28b to register with its local network operating system 56 via a local API 80.

As illustrated in FIG. 9, the network operating system 56 executed by each physical network device 88 includes an executable tag factory 112 configured to selectively create and destroy tag objects 100, as appropriate, and to find existing tags 100. For example, the tag factory 112 executed in the network directory server 28a can manage the creation and destruction of star tags 102a and hash tags 102b. For example, the executable tag factory 112 in an endpoint device (e.g., "A") 12 of the federation "F1" 34 in operation 116 can generate and send a request for a star tag 102a (i.e., a tag object 100 of tag object type "star" 102a).

The directory server 28a is configured for exclusive authority for allocating and revoking star tags 102a in the secure data network 5. The tag factory 112 in the network directory server 28a in operation 118 can determine from a star tag lease list 120 (and/or an inactive star tag list, described below), whether a requested star tag is available, for example bearing a tag title "JohnDoe" 122; alternately the tag factory 112 in the network directory server 28a in operation 118 can grant the star tag 102a without regard to any tag name or any tag title 122, since the directory server 28a can track allocated star tags 102a solely by a tag identifier 124 that comprises the federation ID 18 of the federation (e.g., "F1") 34 allocated the star tag 102a, and a 128-bit tag UUID 128. The tag factory 112 in the network directory server 28 also can validate any name changes to enforce that no duplicate star tag names (e.g., duplicate tag titles 122) are present; hence, the network directory server can enforce that the corresponding star tag name (e.g., tag title 122) and tag identifier 124 are unique in the secure data network 5 are unique.

Hence, the tag factory 112 in the network directory server 28a in operation 118 can assign to the federation "F1" 34 the star tag 102a (i.e., the tag object 100 having the star tag type 102a) for exclusive use by the federation "F1" 34 up to a corresponding star tag lease lifetime (i.e., star tag lifecycle) 24 that is specified in the tag object 100 and recorded by the tag factory in the network directory server 28a into the star tag lease list 120. As described previously, all communications with the network directory server 28a and any endpoint device 12 are secured using "in-flight" secure data packets.

The tag factory 112 in the endpoint device (e.g., "A") 12 of the federation "F1" 34 in operation 132 can respond to acquiring the star tag 102a (i.e., the tag object 100 having the star tag type 102a) by securely storing the star tag 102a (e.g., based on private key encryption as described previously). Hence, the "star" tag 102a (uniquely identifiable by its tag ID 124 comprising the federation ID "F1" 18 and the tag UUID 128) grants to the "federation" user "F1" 34 leasing the "star" tag 102a an exclusive authority to tag a network entity in the secure peer-to-peer data network 5 with an authoritative association between the tagged network entity and the "federation" user "F1" 34.

Since the tag object 100 is a "first class" data object in the secure data network 5, the "federation" user "F1" 34 in operation 132 also can customize the assigned star tag 102a using the tag factory 112 or another authorized application at the app layer 58, for a personalized rendering of the star tag 102a on other data objects tagged with the star tag 102a and that are presented to the "federation" user "F1" 34 or other federation users (e.g., "F2" or "F3") 34. For example, the "federation" user "F1" 34 can add a tag name or tag title "*JohnDoe" 122, a tag image (e.g., an animated GIF) 138, or tag hypercontent 140 that can include one or more body parts 140a, each including a body part ID 142a, a body part content type 142b, and a reference 142c to the body part content (or the actual body part content embedded therein); the "federation" user "F1" 34 in operation 132 also can set a distribution policy 26 that limits the scope (e.g., number of times or to types of entities in the secure data network) that the star tag 102a can be distributed (e.g., a federation 34 lacking a two-way trusted relationship with the "federation" user "F1" 34 owning the star tag 102a may be able to view a network entity (e.g. an online brochure) but may be unable to see the star tag 102a that was tagged by the "federation" user "F1" 34 to the network entity, such that only federations 32 that have a two-way trusted relationship with the owner of the star tag 102a per the distribution policy 26 can see the star tag 102a that is tagged to a network entity. Alternately, a celebrity influencer may set an unlimited distribution policy 26 to gain increased visibility in the secured data network 5, if desired.

The tag factory 112 or any other authorized application (e.g., at the app layer 58) that updates or modifies the tag object 100 (regardless of type star tag 102*a*, type hash tag 102*b*, or type dot tag 102*c*) also updates a "last changed" timestamp 130 that enables identification of the most recent version of a tag object 100, enabling identification of a "stale" tag object 100 and autonomic synchronization between endpoint devices 12 toward the "truth", i.e., the most recently available tag object 100, based on journal entries identifying the "last changed" timestamp, described below.

The "federation" user "F1" 34 in operation 134 can initiate a tagging event using an available endpoint device (e.g., "A") 12, for example via an application executed at the application layer 58. In one example, the federation user "F1" 34 in operation 134 can execute a contact manager that manages (via an API 80) securely-stored signets (146 of FIG. 9)), a messaging app 72 for tagging messages, a community app 30 for tagging community topics or posts, a conversation agent 166 (part of the projection search engine 82 in the network operating system 56) for tagging a conversation object 42, etc. The federation user "F1" 34 in operation 134 can initiate the tagging event based on sending a tagging request, via an API 80, for tagging a network entity with a star tag 102*a* owned by the federation user "F1" 34, any hash tag 102*b*, and/or any dot tag 102*c*. In one example, the federation user "F1" 34 can tag the signets 146 of personal friends known as sharing interest in making home-made pizzas with the dot tag "•PIZZA_LOVERS" 102*c*, and the signets of other federations designated for storing archive data with the dot tag "ARCHIVE" 102*c*; the federation user "F1" 34 also can tag different network entities with the star tag "*JohnDoe" 102*a*, indicating an exclusive authoritative association between the federation user "F1" 34 and the tagged network entities (e.g., an endorsement, ownership advertisement, etc.).

Referring to FIG. 7B, a prescribed API 88 in operation 168 can validate whether the user has the authorization ("rights") (syntactically and semantically) to tag the identified object; in response to the prescribed API 88 validating the tagging event on the identified object, the API 88 accesses the appropriate executable factory instance 170, 172, and/or 176 in the network operating system 56 based on the type of identified object, (e.g., the endpoint factory 170 for tagging an endpoint object 22; the message factory 172 for tagging a message object 36; or a conversation factory 176 for tagging a conversation object). The factory instance 170, 172, and/or 176 in operation 168 can validate the request for the tagging event (e.g., validate that the tagging event is proper for the type of data object being tagged); for example, the factory instance 170, 172, and/or 176 can validate whether the federation user "F1" is authorized to use the star tag "*JohnDoe" 102*a*; the factory instance 170, 172, and/or 176 also can validate whether a hash tag (e.g., "#Coastal_Living") 102*b* has been previously used in the in the network directory server 28*a* (based on confirming its storage in a hash tag list 202).

In response to completing validation, the factory instance 170, 172, and/or 176 in operation 182 can implement the tagging event. For example, the factory instance 170, 172, and/or 176 in operation 182*a* can create a journal entry (184 of FIG. 9) for replication based on the tag object type. For example, since dot tags 102*c* are updated only within the federation 34, the factory instance 170, 172, and/or 176 in operation 182*a* create the journal entry 184, causing the tag factory 112 to detect the new dot tags "•PIZZA_LOVERS" 102*c* and "•ARCHIVE" 102*c* and in response add the new dot tags to the dot tag list 178 in operation 190. The factory instance 170, 172, and/or 176 also can attempt replication between any other endpoint device (e.g., "A1") within the same federation "F1" 32 in operation 182*b*; in response to a successful replication with the other endpoint devices within the same federation 32, the factory instance 170, 172, and/or 176 can clear the corresponding journal entry 184 for the dot tags 102*c* in operation 182*c*.

The factory instance 170, 172, and/or 176 can send an update in operation 182*c* that causes the executable local directory server instance 180 in operation 190 to update a dot tag registry 186 with the corresponding tag identifier 124 and the corresponding entity identifier (e.g., federation ID 18, endpoint ID 20, conversation ID 44) and entity type within an "entity container" 188 that identifies all the network entities (e.g., community, post, conversation object, endpoint object, federation, message object, etc.) that are referenced by the corresponding dot tag 102*c* in the dot tag registry 186.

Since star tags 102*a* and hash tags 102*b* are of "global" scope in the secure data network 5 and managed by the network directory server 28*a*, the factory instance 170, 172, and/or 176 in operation 182*b* can attempt online replication with any two-way trusted device (e.g., endpoint device "B" 12, replicator device "R1" 16), etc. that has any relationship to any of the tagged network entities or any of the star tags 102*a* or hash tags 102*b*. For example, the factory instance 170, 172, and/or 176 can attempt online replication with the replicator device "R1" to update that the star tag "*JohnDoe" 102*a* (identified by its tag ID 124) references one or more entities (identified by their corresponding unique identifier), and that the hash tag "#Coastal_Living" 102*b* references one or more network entities (identified by their corresponding unique identifier); the factory instance 170, 172, and/or 176 also can synchronize with the two-way trusted endpoint device "B" 12, based on the endpoint device "B" sharing one or more of the network entities referenced by the star tag "*JohnDoe" 102*a* and/or the hash tag "#Coastal_Living" 102*b*. The replicator device "R1" 16 can respond by replicating with the network directory server 28*a* executed, for example, in the MCP device 14 (or another physical network device 88 reachable by the replicator device "R1" 16 according to a two-way trusted relationship).

Hence, the executable network directory server instance 196 in operation 192 can update its star tag registry (194 of FIG. 10) to indicate that the star tag "*JohnDoe" 102*a* references one or more network entities, identified within a corresponding entity container 188 by entity identifier (e.g., federation ID 18, endpoint ID 20, conversation ID 44), where the entity container (e.g., "CONTAINER1") 188 identifies all the network entities (e.g., community, post, conversation object, endpoint object, federation, message object, etc.) that are referenced by the corresponding star tag "*JohnDoe" 102*a* in the star tag registry 194. Hence, the star tag registry 194 maps the network entities (within the entity container "CONTAINER1") that have been authoritatively associated with the star tag "*JohnDoe" 102*a*. The executable network directory server instance 196 can execute an indexing of the updated star tag registry 194, resulting in generation and/or updating of a star tag registry index 198 that can contain a hash index for each star tag 102*a* identified in the star tag registry 194.

The executable network directory server instance 196 in operation 192 also can update its hash tag registry 200 (and its hash tag list 202, as appropriate) to indicate the hash tag "#Coastal_Living" 102b references one or more network entities, identified within a corresponding entity container 188 by entity identifier (e.g., federation ID 18, endpoint ID 20, conversation ID 44), where the entity container (e.g., "CONTAINER1") identifies all the network entities (e.g., community, post, conversation object, endpoint object, federation, message object, etc.) that are referenced by the corresponding hash tag "#Coastal_Living" 102b in the hash tag registry 200. Hence, the hash tag registry 200 maps the network entities (within the entity container "CONTAINER1") that have been tagged by any user with the hash tag "#Coastal_Living" 102b. The executable network directory server instance 196 in operation 192 can execute an indexing of the updated hash tag registry 200, resulting in generation and/or updating of a hash tag registry index 204 that can contain a hash index for each hash tag 102b identified in the hash tag registry 200.

Note that the executable local directory server instance 180 also can generate a corresponding dot tag registry index that can contain a hash index for each dot tag 102c identified in the dot tag registry 186.

Hence, the establishing and updating of the dot tag registry 186, the star tag registry 194, and the hash tag registry 200 (and the associated dot tag registry index, the star tag registry index 198, and the hash tag registry index 204) enables an endpoint device (e.g., "A") 12 to attract identified network entities for presentation by the endpoint device, based on identifying any one or more of a star tag 102a, a hash tag 102b, or a dot tag 102c in a data object that is to be presented to a federation user 32. As described below, the ability to "attract" identified network entities is based on the endpoint device selectively executing an authorized and trusted "pulling" or "retrieving" of authorized network entities (e.g., federation entities, secure data objects, etc.) from one or more two-way trusted network devices. Hence, an endpoint device 12 can attract the identified network entities using a "small" exposure to trusted network entities, as opposed to a "broad" exposure of a user (and cookies, user profiles, etc.) to a commercial search engine as in the existing Internet.

Referring to FIG. 7C and FIG. 9, a conversation agent 166 executed within the distributed search (DS) agent 82 of the endpoint device "A" 12 can cause the autonomic and secure "attraction" of identified network entities (e.g., federation entities for use entities in the secure data network 5, data objects, etc.) from two-way trusted sources of the identified network entities. In other words, the autonomic and secure "attraction" of identified network entities from the two-way trusted sources of the identified network entities ensures that a federation user can utilize tag objects 100 from trusted network entities, without risking any exposure to an untrusted entity that could exploit any user identity or user metadata. In particular, a federation user (e.g., "F1") 34 can cause the projection search engine 82 of its trusted endpoint device (e.g., "A") 12 to execute an autonomic and localized projection search to the closest two-way trusted device necessary to "attract" identified network entities that are relevant to search parameters input by a federation user. The search parameters input by a federation user can be as simple as a single tag object, for example an identifiable star tag 102a (owned or not owned by the federation user), a hash tag 102b, and/or a dot tag 102c owned by the federation user; the search parameters input by the federation user 34 also can be an algebraic combination of search parameters that can include search terms, and any combination of any star tag 102a, any hash tag 102b, and/or one or more dot tags 102c owned by the federation user.

Hence, the projection search engine 82 can execute a projection search that is limited in its projection (i.e. "scope") to the trusted two-way devices needed to obtain search results identifying identified network entities matching the algebraic combination of search parameters input by the federation user 34; the search results can cause an executable rendering agent in the message factory 172, referred to as a "distributed lazy loader" 206, to parse hypercontent within identified network entities, for attempted rendering of authorized content (e.g., image/audio/streaming video) on a graphical user interface of the endpoint device 12. As described below, the projection search also can have a transitory lifetime (e.g., during a user interface session) or a persistent duration that can cause the projection search engine 82 to repeat the projection search operations for updated results until a search lifecycle is reached, providing the effect of a "live bookmarked search" that is continually updated (e.g., every 100 milliseconds) as new network entities are detected in the secure data network 5 as matching the algebraic combination of search parameters.

The distributed search agent (i.e., projection search engine) 82 also can include a connection agent 252 configured for assisting a user by automatically forming relationships in response to receiving a salutation request, for example based on machine learning discerning behaviors for identifiable network entities (e.g., with the same last name, within the same business or fraternal organization, etc.).

Referring to FIG. 7C, assume in operation 208 that the federation user "F1" 34 desires to "attract" personal friends known as sharing an interest in making home-made pizzas by hosting a pizza party on July 4: the federation user "F1" 34 in operation 208 can send a request (via an API 80) using a calendar app at the app layer 58 for generation of a "July 4th Pizza Party" event that invites the personal friends tagged in the contact list of signets 146 with the dot tag "•PIZZA_LOVERS" 102c. The federation user entity "F1" 34, via the app layer 58, can request the conversation agent 166 to create a conversation object for the event, where the conversation object includes a title field "July 4th Pizza Party" (or an associated image object referenced in an image field for an image advertisement or "flyer" advertising the party), a reference to the dot tag "•PIZZA_LOVERS" 102c, and a lifecycle ending after the scheduled event (e.g., the day after on Jul. 5, 2021).

The conversation agent 166 in operation 210 can respond to the request via the API 80 by validating the syntax of the request by the federation user "F1" 34, and creating a conversation object (42 of FIG. 2) that specifies a conversation ID 44 (comprising the federation identifier "F1" 18 of the federation user "F1" 34 and a corresponding unique conversation UUID 46), a creation timestamp (e.g., Jun. 1, 2021) 104, and a subscriber/participant list 50 specifying the federation identifier "F1" 18 of the federation user "F1" 34 that created the conversation object (similar operations can be executed on different forms of conversation objects, for example communities or posts, which are different forms of a conversation object).

The conversation agent 166 also adds to the subscriber/participant list 50 the tag ID 124 of the dot tag "•PIZZA_LOVERS" 102c as a "participant" in the conversation object 42. In particular, the conversation agent 166 can send in operation 210 a request to the tag factory 112 for the tag ID 124 of the dot tag "•PIZZA_LOVERS" 102c. If the tag factory 112 detects the dot tag "•PIZZA_LOVERS" 102c is a new dot tag, the tag factory 112 in operation 212 can add the dot tag "•PIZZA_LOVERS" 102c to the local dot tag list 178 with a corresponding tag ID 124 (including the federation ID 18 and the tag UUID 128) as described previously with respect to operation 190, and send the tag ID 124 to the conversation agent 166; however for existing dot tags, the tag factory 112 can return the tag ID 124 of the existing dot tag "•PIZZA_LOVERS" 102c.

The conversation agent 166 in operation 214 can update the dot tag registry 186 with the tag ID 124 of the dot tag "•PIZZA_LOVERS" 102c and the conversation identifier 44 (and object type "conversation") of the conversation object "July 4th Pizza Party" 42 into the corresponding entity container 188 in the dot tag registry 186. The updating of the dot tag registry 186 by the conversation agent 166 causes the executable local directory server instance 180 in operation 214 to update its dot tag registry index for the container of network entities tagged by the dot tag "•PIZZA_LOVERS" 102c to include the conversation object "July 4th Pizza Party" 42.

The conversation agent 166 in operation 216 can execute a projection search on each star tag 102a, hash tag 102b, and/or dot tag 102c in the conversation object "July 4th Pizza Party" 42: as described previously, any detected dot tag 102c is sent to the executable local directory server instance 180 for localized search. The executable local directory server instance 180 in operation 218 responds to reception of the dot tag 102c as a search request for one or more network entities having been tagged with the dot tag (e.g., "•PIZZA_LOVERS"). The executable local directory server instance 180 in operation 218 can access its dot tag registry index for generating the search results that identifies the federation identifiers of the user entities (and/or corresponding data objects, as appropriate) that are identified in the corresponding container 188 as tagged by the dot tag "•PIZZA_LOVERS" 102c. The conversation agent 166 in operation 220 can identify from the search results (e.g., the identifier values obtained from the corresponding container 188) the friends in the contact list of signets 146 tagged by the dot tag "•PIZZA_LOVERS" 102c, and in response the conversation agent 166 in operation 220 can autonomically attract the tagged friends by autonomically creating and securely sending to the tagged friends (e.g., "F2" and "F3") an invitation to join the conversation object "July 4th Pizza Party" 42. As apparent from the foregoing, the invitation does not include any reference to the dot tag "•PIZZA_LOVERS" 102c that was used by the conversation agent 166 to generate the invitation.

Referring to FIG. 7D, the conversation agent 166 in operation 222 can continue to attract the identified network entities by autonomically aggregating the network entities over the persistent lifecycle between the creation timestamp (e.g., Jun. 1, 2021) 104 and the lifecycle policy (e.g., ending Jul. 5, 2021) 24. For example, the conversation agent 166 in operation 222 can respond to detecting, from the local directory server instance 180, that a new friend has a corresponding signet 146 that has been tagged with the dot tag "•PIZZA_LOVERS" 102c (the update of the dot tag registry 186 initiated by the endpoint factory 170 in response to the tagging event), and in response generate and output an updated invitation for the new friend to join the conversation object "July 4th Pizza Party" 42.

Hence, the conversation agent 166 in operation 222 can repeat the aggregation of network entities by adding to the subscriber list 50 invitees that accept the initial or updated invitation to join the conversation object "July 4th Pizza Party" 42, aggregating message objects 36 posted within the conversation, or other content added to the conversation (e.g., authorized updating of any hypercontent 140 within the conversation object "July 4th Pizza Party" 42.

Each update of the conversation object "July 4th Pizza Party" 42 by the conversation agent 166 can cause the distributed lazy loader 206 in any of the federations in the subscriber list to parse in operation 226 the hypercontent 140 in the "July 4th Pizza Party" 42 (and/or the hypercontent 140 in any star tag object 102a or hash tag object 102b in the conversation) for identification and secure retrieval of any authorized hypercontent parts from two-way trusted sources in the secure data network 5. Hence, the distributed lazy loader 206 only renders authorized hypercontent that can be securely retrieved from a two-way trusted source of the hypercontent parts according to a "whisper" protocol, where the distributed lazy loader 206 first attempts retrieval from participants in the conversation (e.g. locally stored copies of any message objects 36', endpoint objects 22', and/or conversation objects 42' from trusted federations as illustrated in FIG. 9), followed by trusted federation entities from the list of signets 146, followed by a trusted community forum (e.g., a federation operating as a vendor on a community server 30, etc.). If no authorized retrieval of a hypercontent can be found, the distributed lazy loader 206 can add a "dummy graphic" as a substitute for any unauthorized or unavailable hypercontent part.

The distributed lazy loader 206 in an endpoint device (e.g., "A") 12 of the federation user "F1" that created the conversation object "July 4th Pizza Party" 42 tagged with the dot tag "•PIZZA_LOVERS" 102c in operation 226 also can render any tag hypercontent 140 from the dot tag "•PIZZA_LOVERS" 102c as an enhanced, private presentation to the federation user "F1".

The attraction by the conversation agent 166 also can include the conversation agent 166 detecting in operation 228 a star tag (e.g., "*CHICAGO_BRICK_OVEN") 102a and a hash tag (e.g., "#SALE") 102b that was added after the creation timestamp 104 by any one or more of the subscribers specified in the subscriber list 50, for example as an inquiry by one of the subscribers about the availability of a promotional sale of a home pizza oven by the manufacturer identified authoritatively in the secure data network by the star tag "*CHICAGO_BRICK_OVEN" 102a.

Hence, the conversation agent 166 in operation 228 can respond to the star tag "*CHICAGO_BRICK_OVEN" 102a and the hash tag "#SALE" 102b added to the conversation object "July 4th Pizza Party" 42 by executing a projection search on the star tag "*CHICAGO_BRICK_OVEN" 102a and the hash tag "#SALE" 102b. As described previously, the projection search by the conversation agent 166 can start with federation devices in the same federation 34, followed by searching trusted devices identified in the conversation subscriber list 50, followed by searching trusted network devices identified in the signet list 146, followed by sending the search request "*CHICAGO_BRICK_OVEN AND #SALE" to the replicator device "R1" 16.

The replicator device "R1" 16, in response to receiving the search request in operation 230, can selectively forward the search request to the network directory server 28a if the replicator device "R1" 16 cannot provide the search result from a locally-cached search index.

The executable network directory server instance 196 of the network directory server 28a in operation 232 can respond to receiving the search request "*CHICAGO_BRICK_OVEN AND #SALE" by accessing its star tag registry index 198 for all network entities in the corresponding container 188 of the star tag registry 194 for the star tag "*CHICAGO_BRICK_OVEN" 102*a*.

Referring to FIG. 7E, the executable network directory server instance 196 of the network directory server 28*a* also can access in operation 234 its hash tag registry index 204 in for all network entities in the corresponding container 188 for the hash tag "#SALE" 102*b*.

The executable network directory server instance 196 of the network directory server 28*a* in operation 234 also can execute an algebraic matching of the network entities having the star tag "*CHICAGO_BRICK_OVEN" 102*a* and the hash tag "#SALE" 102*b*, for example based on matching referenced network entities between the associated container 188 for the star tag "*CHICAGO_BRICK_OVEN" 102*a* and the associated container for the hash tag "SALE" 102*b* (or based on executing algebraic matching of hashed values from hashed indexes, as appropriate); if specified in the search query, the executable network directory server instance 196 of the network directory server 28*a* in operation 234 also can execute additional algebraic or logical operations based on the search elements presented in the search query (e.g., text string, network entity type "post", etc.). The executable network directory server instance 196 of the network directory server 28*a* also can execute a hashing of the search query and search results, and hashing of the search results, for subsequent search requests.

Hence, the executable network directory server instance 196 of the network directory server 28*a* in operation 234 can provide to the replicator device "R1" 16 (for delivery to the endpoint device "A" 12 of the federation "F1" 34) the search result that identifies the identified network entities tagged with the star tag "*CHICAGO_BRICK_OVEN" 102*a* and the hash tag "#SALE" 102*b*. In one example, the search result can identify a federation identifier for a vendor in the secure data network 5 that is offering a July 4 sale for home pizza ovens, including network objects (conversations, posts, message objects, etc.) that identify a sale on home pizza ovens tagged by the manufacturer that owns the star tag "*CHICAGO_BRICK_OVEN" 102*a*.

The conversation agent 166 executed in the endpoint device (e.g., "A") 12 in the federation entity 32 can respond to the search results by updating the conversation object "July 4th Pizza Party" 42 to include the identified network entities specified in the search result (by federation ID, endpoint ID, message ID, etc.). Hence, the distributed lazy loader 206 of the endpoint device (e.g., "A") 12 (and endpoint devices "B" and "C" upon synchronization with the endpoint device "A") can instantly render in operation 236 the updated conversation by locating and obtaining the authorized content from the aggregated network entity identifiers, including for example the sales flyer by the vendor that is offering the July 4 sale for home pizza ovens, including a sales flyer for a home pizza oven made by the manufacturer that owns the star tag "*CHICAGO_BRICK_OVEN" 102*a*.

According to example embodiments, the directory servers 28*a* and 28*b* provide secure information management that enables an endpoint device to attract identified network entities (identified from a projection search) for presentation by the endpoint device, based on secure and authorized retrieval from two-way trusted content sources. Hence, the example embodiments enable information management to be deployed by an endpoint device that minimizes unwanted exposure of a user to an untrusted entity in a data network.

The example embodiments also maintain security by enforcing the lifecycle policies 24 of each of the star tags 102*a* and/or hash tags 102*b*, as well as the lifecycle policies 24 of associated conversation objects 42, message objects 36, etc.

Referring to FIG. 7F, the conversation agent 166 in an endpoint device "A" 12 in operation 238 can detect a lifecycle end according to the lifecycle policy 24 (e.g., Jul. 5, 2021 for the conversation object "July 4th Pizza Party" 42): assuming the conversation object "July 4th Pizza Party" 42 has not been updated with an updated lifecycle policy 24, or the addition of another tag that provides a longer lifecycle policy that can be inherited by the conversation object "July 4th Pizza Party" 42, the conversation agent 166 in operation 240 can zeroize (i.e., securely erase in a cryptographically secure manner) the conversation object "July 4th Pizza Party" 42 and any message objects that inherited the Jul. 5, 2021 lifecycle policy end.

If, however, during its initial lifecycle policy 24 another dot tag "ARCHIVE" 102*c* was added by the federation user "F1" 34 to the conversation object "July 4th Pizza Party" 42 (for example to save at least a portion of the conversation object for future reference related to the home pizza oven found via the network directory server 28*a*, messages in the conversation, etc.), the conversation agent 166 in operation 242 can request the executable local directory server instance 180 for network entities having the dot tag "ARCHIVE" 102*c*: the executable local directory server instance 180 in operation 242 can respond to receiving the search request for the network entities tagged with the dot tag "ARCHIVE" 102*c* by searching its dot tag registry 186 (or associated dot tag index), and generating a search result identifying the identified network entities in the corresponding container 188 that are identified as "backup buddies" for the federation "F1" 34.

The conversation agent 166 in operation 244 can securely synchronize any conversation part (or the entire conversation object "July 4th Pizza Party" 42) with the federation identifiers associated with the "backup buddies" (as identified from their respective signets 146), for secure "at-rest" storage in the endpoint objects of the "backup buddies", using the lifecycle policy 24 inherited from the dot tag "ARCHIVE" 102*c* (e.g., ten (10) years).

Referring to FIG. 7G and FIG. 10, the executable network directory server instance 196 in operation 246 can detect that its hash tag registry 200 is reaching capacity, and in response the lifecycle manager (248 of FIGS. 9 and 10) in the network directory server 28*a* can move the oldest (e.g., least-used) hash tag 102*b* (and associated search indexes) from the top-level hash tag registry 200 (and the hash tag registry index 204) to the first LRU cache 250; older entries in the LRU cache 250 can be pushed downward toward the bottom of the LRU cache 250 to even a lower LRU cache, if available.

Hence, the lifecycle manager 248 in the network directory server 28*a* can cause the tag factory 112 to zeroize in operation 252 the oldest hash tag objects 102*b* in response to detecting the associated network entities that were tagged by the oldest hash tag objects 102*b* have either expired or been zeroized according to their respective lifecycle policies 24. Hence, a hash tag 102*b* can be zeroized by the tag factory 112 once all the tagged network entities have expired or been zeroized. Since a hash tag 102*b* is dynamic and usable by any user entity in the secure data network 5, a new use of a zeroized hash tag 102*b* can be introduced by a user entity as described above.

As described previously, the lifecycle distribution policy 24 of each star tag 102*a* is enforced by the network directory server 28*a*. Referring to FIG. 7H, the lifecycle manager 248 in the network directory server 28*a* in operation 254 can detect the expiration of the enforceable lifetime of an aging star tag 102*a*: the authorized user entity (e.g., "F1") can be sent one or more reminders to renew the lease for exclusive use of the star tag 102*a*.

The lifecycle manager 248 in the network directory server 28*a* in operation 256 can revoke the exclusive authority to use the aging star tag 102*a* for tagging network entities, based on moving the aging star tag 102*a* from the star tag lease list 120 to an inactive star tag list (not shown in FIG. 10): the inactive star tag list enables the executable network directory server instance 196 to continue executing searching for network entities previously tagged with the aging star tag 102*a* during the interval that the authorized user entity (e.g., "F1") could authoritatively the network entities with the star tag 102*a*.

The lifecycle manager 248 in the network directory server 28*a* in operation 258 can cause the tag factory 112 to zeroize the aging star tag 102*a* from the inactive star tag list in response to detecting that the referenced network entities (that had been tagged with the aging star tag 102*a*) have expired according to their respective lifecycle policies 24.

According to example embodiments, distributed directory servers can provide a secure coordination and retrieval of information throughout the secure peer-to-peer data network based on enabling endpoint devices to securely attract identified network entities in a manner that protects user identities and content creation rights, without any hidden data mining by a third party. The example embodiments enable endpoint devices to securely attract network entities from two-way trusted data sources, and enables the enforcement of exclusive authority in establishing authoritative associations between one or more network entities and an identified user entity, all while preventing data mining by third party search providers.

Although the example embodiments illustrate the pairwise topology of two-way trusted replicator devices as a mesh of trusted replicator devices, other topologies (e.g., star, tree, hybrid, etc.) can be used to deploy the pairwise topology of two-way trusted replicator devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
establishing, by a first executable resource in a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner;
receiving, by the first executable resource, a search request for one or more identified network entities having been tagged with the tag object, and in response generating a search result based on identifying the identified network entities having been mapped relative to the tag object, the search result identifying one or more of an identified federation identifier or an identified unique identifier for the respective identified network entities; and
providing the search result by the first executable resource, the search result causing an endpoint device to attract the identified network entities for presentation by the endpoint device;
wherein the search request is for the one or more identified network entities having been tagged with the tag object and a second tag object, the tag object of a first tag object type granting the identified user entity an exclusive authority to establish an authoritative association with the one or more identified network entities, the second tag object of a second tag object type permitting association with any network entity by any user entity, the generating including:
accessing a reference in the registry for the tag object for identification of first referenced network entities associated with the tag object;
accessing a corresponding reference for the second tag object in a second registry, providing a mapping between tag objects of the second tag object type, for identification of second referenced network entities associated with the second tag object; and
identifying the identified network entities belonging to the first referenced network entities and the second referenced network entities;
wherein the causing an endpoint device to attract includes the endpoint device attracting the identified network entities based on selectively retrieving the identified network entities, from the secure peer-to-peer data network, based on a secure retrieval with at least a second network device having a two-way trusted relationship with the endpoint device.

2. The method of claim 1, wherein:
the first executable resource is a directory server executed by the network device within the secure peer-to-peer data network;
the method further comprising the directory server enforcing exclusive assignment of each tag object of the first tag object type for the corresponding enforceable lifetime, including assigning the tag object, having the first tag object type, to the identified user entity;
the assigning granting the identified user entity an exclusive authority in the secure peer-to-peer data network to tag the one or more of the network entities with the tag object, for establishing the authoritative association between the one or more network entities and the identified user entity.

3. The method of claim 2, wherein the enforcing exclusive assignment comprises:
revoking the exclusive authority from the identified user entity upon expiration of the enforceable lifetime of the tag object; and
zeroizing the tag object from the registry based on detecting expiration of all the one or more network entities tagged with the tag object.

4. The method of claim 2, further comprising:
establishing, by the directory server, the second registry providing the mapping between the any network entity having been associated with the second tag object by one or more user entities, wherein the second tag object is of the second tag object type that is owned by the directory server for unrestricted use by any user entity in the secure peer-to-peer data network;
the enforceable lifetime of each tag object of the second tag object type based on a corresponding last use relative to the respective enforceable lifetimes of network entities associated with the corresponding tag object of the second tag object type.

5. The method of claim 4, wherein the establishing the second registry comprises:
moving the second tag object from the second registry to a least-recently-used cache based on determining the second tag object has an oldest use relative to other tag objects of the second tag object type that are stored in the second registry; and
zeroizing the second tag object based on detecting expiration of all the network entities associated with the second tag object, according to the respective enforceable lifetimes.

6. The method of claim 1, wherein the search request further specifies the identified network entities are of a prescribed entity type, the generating further comprising identifying the identified network entities belonging to the first referenced network entities and the second referenced network entities and having the prescribed entity type.

7. A method comprising:
establishing, by a first executable resource in a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner;
receiving, by the first executable resource, a search request for one or more identified network entities having been tagged with the tag object, and in response generating a search result based on identifying the identified network entities having been mapped relative to the tag object, the search result identifying one or more of an identified federation identifier or an identified unique identifier for the respective identified network entities; and
providing the search result by the first executable resource, the search result causing an endpoint device to attract the identified network entities for presentation by the endpoint device, wherein:
the network device executing the first executable resource is the endpoint device attracting the identified network entities based on the search result;
the tag object by the identified user entity is of a first tag object type that restricts usage and search scope to a federation scope comprising at least the endpoint device having been allocated the corresponding federation identifier of the identified user;
the method further comprises a second executable resource in the endpoint device causing the attracting of at least a portion of the identified network entities, based on the second executable resource detecting creation of a conversation identified by a conversation object that references the tag object, and sending a secure invitation for joining the conversation to one of the identified network entities having a two-way trusted relationship with the identified user.

8. The method of claim 7, further comprising:
generating, by the second executable resource in the endpoint device, the search request in response to detecting the tag object referenced in the conversation object;
the attracting further includes the second executable resource aggregating the search result with successive search results for additional identified network entities associated with the tag object for up to an identified deadline.

9. The method of claim 7, further comprising:
generating, by a third executable resource in the endpoint device, the presentation for the identified user entity of the endpoint device based on selectively obtaining hypercontent elements identified by any one or of the tag object, the conversation object, or any of the identified network entities attracted to the conversation, and further based on the identified user entity having acquired rights for obtaining each of the hypercontent elements according to a two-way trusted relationship.

10. The method of claim 7, further comprising:
acquiring, by the endpoint device for the identified user, a second tag object of a second tag object type providing an exclusive authority in the secure peer-to-peer data network to tag a selected network entity with the second tag object, for establishing an authoritative association between the selected network entity and the identified user entity; and
selectively sending, by the endpoint device, a unique tag identifier for the second tag object and a corresponding unique identifier for the selected network entity to a destination in the secure peer-to-peer data network, enabling searching in the secure peer-to-peer data network of the authoritative association between the selected network entity and the identified user entity.

11. The method of claim 10, wherein:
the selected network entity is tagged with the second tag object during an offline state where the endpoint device is disconnected from the secure peer-to-peer data network;
the method further comprises storing, as a journal entry data structure in a non-transitory machine readable medium, the unique tag identifier for the second tag object and the corresponding unique identifier for the selected network entity;
the selectively sending including executing autonomic synchronization of the journal entry data structure with the destination in the secure peer-to-peer data network, in response to detecting the endpoint device has reconnected with the secure peer-to-peer data network.

12. One or more non-transitory tangible media encoded with logic for execution by a machine and when executed by the machine operable for:
establishing, by a first executable resource in the machine implemented as a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner;
receiving, by the first executable resource, a search request for one or more identified network entities having been tagged with the tag object, and in response generating a search result based on identifying the identified network entities having been mapped relative to the tag object, the search result identifying one or more of an identified federation identifier or an identified unique identifier for the respective identified network entities; and providing the search result by the first executable resource, the search result causing an endpoint device to attract the identified network entities for presentation by the endpoint device;

wherein the search request is for the one or more identified network entities having been tagged with the tag object and a second tag object, the tag object of a first tag object type granting the identified user entity an exclusive authority to establish an authoritative association with the one or more identified network entities, the second tag object of a second tag object type permitting association with any network entity by any user entity, the generating including:

accessing a reference in the registry for the tag object for identification of first referenced network entities associated with the tag object;

accessing a corresponding reference for the second tag object in a second registry, providing a mapping between tag objects of the second tag object type, for identification of second referenced network entities associated with the second tag object; and identifying the identified network entities belonging to the first referenced network entities and the second referenced network entities;

wherein the causing an endpoint device to attract includes the endpoint device attracting the identified network entities based on selectively retrieving the identified network entities, from the secure peer-to-peer data network, based on a secure retrieval with at least a second network device having a two-way trusted relationship with the endpoint device.

13. The one or more non-transitory tangible media of claim 12, wherein:

the first executable resource is a directory server executed by the network device within the secure peer-to-peer data network;

the one or more non-transitory tangible media further operable for enforcing exclusive assignment of each tag object of the first tag object type for the corresponding enforceable lifetime, including assigning the tag object, having the first tag object type, to the identified user entity;

the assigning granting the identified user entity an exclusive authority in the secure peer-to-peer data network to tag the one or more of the network entities with the tag object, for establishing the authoritative association between the one or more network entities and the identified user entity.

14. One or more non-transitory tangible media encoded with logic for execution by a machine and when executed by the machine operable for:

establishing, by a first executable resource in the machine implemented as a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner;

receiving, by the first executable resource, a search request for one or more identified network entities having been tagged with the tag object, and in response generating a search result based on identifying the identified network entities having been mapped relative to the tag object, the search result identifying one or more of an identified federation identifier or an identified unique identifier for the respective identified network entities; and providing the search result by the first executable resource, the search result causing an endpoint device to attract the identified network entities for presentation by the endpoint device, wherein:

the network device executing the first executable resource is the endpoint device attracting the identified network entities based on the search result;

the tag object by the identified user entity is of a first tag object type that restricts usage and search scope to a federation scope comprising at least the endpoint device having been allocated the corresponding federation identifier of the identified user;

the one or more non-transitory tangible media further operable for a second executable resource in the endpoint device causing the attracting of at least a portion of the identified network entities, based on the second executable resource detecting creation of a conversation identified by a conversation object that references the tag object, and sending a secure invitation for joining the conversation to one of the identified network entities having a two-way trusted relationship with the identified user.

15. The one or more non-transitory tangible media of claim 14, further operable for:

generating, by the second executable resource in the endpoint device, the search request in response to detecting the tag object referenced in the conversation object;

the attracting further includes the second executable resource aggregating the search result with successive search results for additional identified network entities associated with the tag object for up to an identified deadline.

16. The one or more non-transitory tangible media of claim 14, further operable for:

acquiring, by the endpoint device for the identified user, a second tag object of a second tag object type providing an exclusive authority in the secure peer-to-peer data network to tag a selected network entity with the second tag object, for establishing an authoritative association between the selected network entity and the identified user entity; and selectively sending, by the endpoint device, a unique tag identifier for the second tag object and a corresponding unique identifier for the selected network entity to a destination in the secure peer-to-peer data network, enabling searching in the secure peer-to-peer data network of the authoritative association between the selected network entity and the identified user entity.

17. An apparatus implemented as a physical machine, the apparatus comprising:

non-transitory machine readable media configured for storing executable machine readable code;

a device interface circuit; and a processor circuit configured for executing the machine readable code, and when executing the machine readable code operable for:

establishing, by the apparatus implemented as a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner;

receiving a search request for one or more identified network entities having been tagged with the tag object, and in response generating a search result based on identifying the identified network entities having been mapped relative to the tag object, the search result identifying one or more of an identified federation identifier or an identified unique identifier for the respective identified network entities; and providing the search result for an endpoint device, the search result causing the endpoint device to attract the identified network entities for presentation by the endpoint device;

wherein the search request is for the one or more identified network entities having been tagged with the tag object and a second tag object, the tag object of a first tag object type granting the identified user entity an exclusive authority to establish an authoritative association with the one or more identified network entities, the second tag object of a second tag object type permitting association with any network entity by any user entity, the generating including:

accessing a reference in the registry for the tag object for identification of first referenced network entities associated with the tag object;

accessing a corresponding reference for the second tag object in a second registry, providing a mapping between tag objects of the second tag object type, for identification of second referenced network entities associated with the second tag object; and identifying the identified network entities belonging to the first referenced network entities and the second referenced network entities;

wherein the causing an endpoint device to attract includes the endpoint device attracting the identified network entities based on selectively retrieving the identified network entities, from the secure peer-to-peer data network, based on a secure retrieval with at least a second network device having a two-way trusted relationship with the endpoint device.

18. The apparatus of claim 17, wherein: the first executable resource is a directory server executed by the network device within the secure peer-to-peer data network; the directory server enforcing exclusive assignment of each tag object of the first tag object type for the corresponding enforceable lifetime, including assigning the tag object, having the first tag object type, to the identified user entity; the assigning granting the identified user entity an exclusive authority in the secure peer-to-peer data network to tag the one or more of the network entities with the tag object, for establishing the authoritative association between the one or more network entities and the identified user entity.

19. An apparatus implemented as a physical machine, the apparatus comprising:

non-transitory machine readable media configured for storing executable machine readable code;

a device interface circuit; and a processor circuit configured for executing the machine readable code, and when executing the machine readable code operable for:

establishing, by the apparatus implemented as a network device having joined a secure peer-to-peer data network, a registry providing a mapping between one or more network entities having been associated with a tag object by an identified user entity, each network entity represented by one of a federation identifier of a user entity or a corresponding data object, the tag object and each data object each having an enforceable lifetime, a corresponding unique identifier, and the federation identifier identifying a corresponding owner;

receiving a search request for one or more identified network entities having been tagged with the tag object, and in response generating a search result based on identifying the identified network entities having been mapped relative to the tag object, the search result identifying one or more of an identified federation identifier or an identified unique identifier for the respective identified network entities; and providing the search result for an endpoint device, the search result causing the endpoint device to attract the identified network entities for presentation by the endpoint device, wherein:

the network device executing the first executable resource is the endpoint device attracting the identified network entities based on the search result;

the tag object by the identified user entity is of a first tag object type that restricts usage and search scope to a federation scope comprising at least the endpoint device having been allocated the corresponding federation identifier of the identified user;

the machine readable code further comprising a second executable resource and when executed by the the processor circuit in the endpoint device causing the attracting of at least a portion of the identified network entities, based on the second executable resource detecting creation of a conversation identified by a conversation object that references the tag object, and sending a secure invitation for joining the conversation to one of the identified network entities having a two-way trusted relationship with the identified user.

20. The apparatus of claim 19, wherein the processor circuit is further operable for:

generating, by the second executable resource in the endpoint device, the search request in response to detecting the tag object referenced in the conversation object;

the attracting further includes the second executable resource aggregating the search result with successive search results for additional identified network entities associated with the tag object for up to an identified deadline.

* * * * *

UNITED STATES PATENT AND TRADEMARK OFFICE
CERTIFICATE OF CORRECTION

| | | |
|---|---|---|
| PATENT NO. | : 12,113,785 B2 | |
| APPLICATION NO. | : 17/372607 | |
| DATED | : October 8, 2024 | |
| INVENTOR(S) | : Moon | |

It is certified that error appears in the above-identified patent and that said Letters Patent is hereby corrected as shown below:

In the Claims

Column 48, Claim 9, Line 10, after "any one or" insert --more--.

Column 52, Claim 19, Line 40, after "executed by the" delete "the".

Signed and Sealed this
Fifth Day of November, 2024

Katherine Kelly Vidal
*Director of the United States Patent and Trademark Office*